(12) United States Patent
Jenkins et al.

(10) Patent No.: US 8,796,395 B2
(45) Date of Patent: Aug. 5, 2014

(54) POLYESTERS CONTAINING PARTICULAR PHOSPHORUS COMPOUNDS BLENDED WITH OTHER POLYMERS

(75) Inventors: Jason Christopher Jenkins, Kingsport, TN (US); Dennis Edward Brickey, Blountville, TN (US); Michael Eugene Donelson, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 12/973,282

(22) Filed: Dec. 20, 2010

(65) Prior Publication Data
US 2012/0157604 A1    Jun. 21, 2012

(51) Int. Cl.
*C08L 69/00* (2006.01)

(52) U.S. Cl.
USPC ............ 525/439; 525/437; 525/461; 525/466

(58) Field of Classification Search
USPC ................................. 525/437, 439, 461, 466
See application file for complete search history.

(56) References Cited

U.S. PATENT DOCUMENTS

| | | | |
|---|---|---|---|
| 3,169,121 A | 2/1965 | Goldberg | |
| 3,207,814 A | 9/1965 | Goldberg | |
| 4,156,069 A | 5/1979 | Prevorsek et al. | |
| 4,194,038 A | 3/1980 | Baker et al. | |
| 4,430,484 A | 2/1984 | Quinn | |
| 4,452,933 A | 6/1984 | McCready | |
| 4,465,820 A | 8/1984 | Miller et al. | |
| 4,788,251 A * | 11/1988 | Brown et al. | 525/67 |
| 4,981,898 A | 1/1991 | Bassett | |
| 5,654,347 A | 8/1997 | Khemani et al. | |
| 5,696,176 A | 12/1997 | Khemani et al. | |
| 5,973,100 A | 10/1999 | Asrar et al. | |
| 6,043,322 A | 3/2000 | Scott et al. | |
| 6,559,272 B1 | 5/2003 | Jeon et al. | |
| 6,600,067 B2 | 7/2003 | Sicken et al. | |
| 7,189,777 B2 | 3/2007 | Quillen et al. | |
| 2004/0063864 A1* | 4/2004 | Adams et al. | 525/390 |
| 2006/0004151 A1 | 1/2006 | Shaikh et al. | |
| 2008/0293912 A1 | 11/2008 | Jernigan | |

FOREIGN PATENT DOCUMENTS

| | | | | |
|---|---|---|---|---|
| CN | 1962715 A | 5/2007 | | |
| CN | 101485998 A | 7/2009 | | |
| EP | 0058293 | * 8/1982 | ........... | C08K 5/5317 |
| EP | 1156070 A1 | 11/2001 | | |
| WO | 9856848 A1 | 12/1998 | | |

OTHER PUBLICATIONS

Berger-Schunn, Practical Color Measurement: A Primer for the Beginner, a Reminder for the Expert, 1994, pp. 39-56 and 91-98, John Wiley & Sons, Inc.

USPTO Office Action dated Jun. 1, 2012 for copending application U.S. Appl. No. 12/973,277.
Machine translation of abstract for CN 1014855998 A.
Full translation of Saischek et al. EP 58293.
USPTO Office Action dated Nov. 29, 2012 for co-pending U.S. Appl. No. 12/973,227.
USPTO Office Action dated Jun. 1, 2012 for copending U.S. Appl. No. 12/973,277.
USPTO Office Action dated Nov. 14, 2014 for co-pending U.S. Appl. No. 12/973,277.

* cited by examiner

*Primary Examiner* — Robert Jones, Jr.
(74) *Attorney, Agent, or Firm* — Betty J. Boshears

(57) ABSTRACT

Described as one aspect of the invention are polymer blends comprising at least one polyester wherein the polymer blend comprises:
(A) a polyester composition comprising
(I) at least one polyester (Polymer A) which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 10 to about 90 mole % of ethylene glycol residues; and
(ii) about 90 to about 10 mole % of cyclohexanedimethanol residues;
(II) residues of at least one titanium compound; and
(III) at least one chelating phosphorus species, reaction products thereof, or mixtures thereof, represented by the structure:

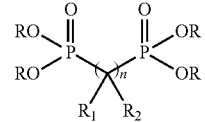

wherein:
n=an integer from 1 to 4;
R can be hydrogen or $C_1$-$C_{22}$-alkyl; and
R1 and R2 each can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.; and
(B) at least one polymeric component other than Polymer A.

31 Claims, No Drawings

POLYESTERS CONTAINING PARTICULAR PHOSPHORUS COMPOUNDS BLENDED WITH OTHER POLYMERS

FIELD OF THE INVENTION

The present invention generally relates to polyesters made from terephthalic acid, or an ester thereof, and mixtures thereof, ethylene glycol, and cyclohexanedimethanol, and a compound containing at least one chelating phosphorus species and/or reaction products thereof and/or blends of these polyesters with other polymers.

BACKGROUND OF THE INVENTION

Glycol modified PET (PETG), a polyester based solely on terephthalic acid (TPA) or an ester thereof, ethylene glycol, and cyclohexanedimethanol, is known in the art and is commercially available.

PETG is sometimes produced with a catalyst/stabilizer system which, given the rates at which polymer is produced, yields a polymer that barely meets color specifications. If color formation increases further, however, the polymer has lower value. In order to assure good color formation, a high purity terephthalic acid is sometimes used. The production of this high purity TPA adds significant cost to the process as a whole.

Thus, there is a need in the art for a system which produces PETG copolyesters with less color than the current catalyst/stabilizer system There is also a need in the art for polymer blends containing such PETG copolyesters.

SUMMARY OF THE INVENTION

It is believed that certain polyester compositions comprising terephthalic acid, an ester thereof, and/or mixtures thereof, cyclohexanedimethanol, and ethylene glycol, further comprising at least one chelating phosphorus species and/or reaction products thereof, are superior to certain polyesters known in the art with respect to good color and/or clarity.

It is also believed that certain polymer blends containing the polyester of the invention are also superior to certain polymer blends known in the art with respect to good color and/or clarity In one aspect, the invention provides a polyester composition comprising:
(I) at least one polyester which comprises:
   (a) a dicarboxylic acid component comprising:
      (i) 70 to 100 mole % of terephthalic acid residues;
      (ii) 0 to 30 mole % of aromatic dicarboxylic acid residues having up to 20 carbon atoms; and
      (iii) 0 to 10 mole % of aliphatic dicarboxylic acid residues having up to 16 carbon atoms; and
   (b) a glycol component comprising:
      (i) about 10 to about 90 mole % of ethylene glycol residues; and
      (ii) about 90 to about 10 mole % of cyclohexanedimethanol residues;
(II) residues of at least one titanium compound; and
(III) at least one chelating phosphorus species, reaction products thereof, or mixtures thereof, represented by the structure:

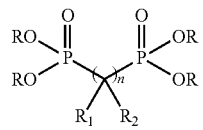

wherein:
n=an integer from 1 to 4;
R can be hydrogen or $C_1$-$C_{22}$-alkyl; and
R1 and R2 each can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
   (a) a dicarboxylic acid component comprising:
      (i) 70 to 100 mole % of terephthalic acid residues;
      (ii) 0 to 30 mole % of aromatic dicarboxylic acid residues having up to 20 carbon atoms; and
      (iii) 0 to 10 mole % of aliphatic dicarboxylic acid residues having up to 16 carbon atoms; and
   (b) a glycol component comprising:
      (i) about 20 to about 80 mole % of ethylene glycol residues; and
      (ii) about 20 to about 80 mole % of cyclohexanedimethanol residues;
(II) residues of at least one titanium compound; and
(III) at least one chelating phosphorus species, reaction products thereof, or mixtures thereof, represented by the structure:

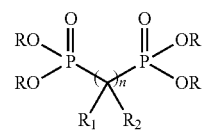

wherein:
n=an integer from 1 to 4;
R can be hydrogen or $C_1$-$C_{22}$-alkyl; and
R1 and R2 each can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
   (a) a dicarboxylic acid component comprising:
      (i) 70 to 100 mole % of terephthalic acid residues;
      (ii) 0 to 30 mole % of aromatic dicarboxylic acid residues having up to 20 carbon atoms; and
      (iii) 0 to 10 mole % of aliphatic dicarboxylic acid residues having up to 16 carbon atoms; and (b) a glycol component comprising:
   (i) greater than about 50 mole % of ethylene glycol residues; and
   (ii) less than about 50 mole % of cyclohexanedimethanol residues;
(II) residues of at least one titanium compound; and
(III) at least one chelating phosphorus species, reaction products thereof, or mixtures thereof, represented by the structure:

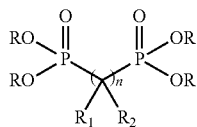

wherein:
n=an integer from 1 to 4;
R can be hydrogen or $C_1$-$C_{22}$-alkyl; and
R1 and R2 each can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
   (a) a dicarboxylic acid component comprising:
      (i) 70 to 100 mole % of terephthalic acid residues;
      (ii) 0 to 30 mole % of aromatic dicarboxylic acid residues having up to 20 carbon atoms; and
      (iii) 0 to 10 mole % of aliphatic dicarboxylic acid residues having up to 16 carbon atoms; and
   (b) a glycol component comprising:
      (i) about 40 to about 80 mole % of ethylene glycol residues; and
      (ii) about 20 to about 60 mole % of cyclohexanedimethanol residues;
(II) residues of at least one titanium compound; and
(III) at least one chelating phosphorus species, reaction products thereof, or mixtures thereof, represented by the structure:

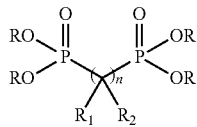

wherein:
n=an integer from 1 to 4;
R can be hydrogen or $C_1$-$C_{22}$-alkyl; and
R1 and R2 each can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
   (a) a dicarboxylic acid component comprising:
      (i) 70 to 100 mole % of terephthalic acid residues;
      (ii) 0 to 30 mole % of aromatic dicarboxylic acid residues having up to 20 carbon atoms; and
      (iii) 0 to 10 mole % of aliphatic dicarboxylic acid residues having up to 16 carbon atoms; and
   (b) a glycol component comprising:
      (i) about 60 to about 80 mole % of ethylene glycol residues; and
      (ii) about 20 to about 40 mole % of cyclohexanedimethanol residues;
(II) residues of at least one titanium compound; and
(III) at least one chelating phosphorus species, reaction products thereof, or mixtures thereof, represented by the structure:

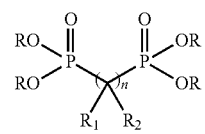

wherein:
n=an integer from 1 to 4;
R can be hydrogen or $C_1$-$C_{22}$-alkyl; and
R1 and R2 each can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
   (a) a dicarboxylic acid component comprising:
      (i) 70 to 100 mole % of terephthalic acid residues;
      (ii) 0 to 30 mole % of aromatic dicarboxylic acid residues having up to 20 carbon atoms; and
      (iii) 0 to 10 mole % of aliphatic dicarboxylic acid residues having up to 16 carbon atoms; and
   (b) a glycol component comprising:
      (i) about 60 to about 75 mole % of ethylene glycol residues; and
      (ii) about 25 to about 40 mole % of cyclohexanedimethanol residues;
(II) residues of at least one titanium compound; and
(III) at least one chelating phosphorus species, reaction products thereof, or mixtures thereof, represented by the structure:

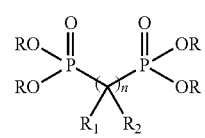

wherein:
n=an integer from 1 to 4;
R can be hydrogen or $C_1$-$C_{22}$-alkyl; and
R1 and R2 each can be hydrogen, $C_1$-$C_{22}$-alkyl, hydroxyl, or aryl;

wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
  (a) a dicarboxylic acid component comprising:
    (i) 70 to 100 mole % of terephthalic acid residues;
    (ii) 0 to 30 mole % of aromatic dicarboxylic acid residues having up to 20 carbon atoms; and
    (iii) 0 to 10 mole % of aliphatic dicarboxylic acid residues having up to 16 carbon atoms; and
  (b) a glycol component comprising:
    (i) about 10 to about 90 mole % of ethylene glycol residues; and
    (ii) about 10 to about 90 mole % of cyclohexanedimethanol residues;
(II) residues of at least one titanium compound; and
(III) at least one chelating phosphorus species, reaction products thereof, or mixtures thereof, represented by the structure:

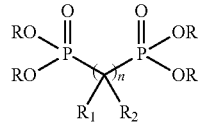

wherein:
n=an integer from 1 to 4;
R is hydrogen; and
R1 and R2 each can be hydrogen, $C_1$-$C_{22}$-alkyl, hydroxyl, or aryl;

wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
  (a) a dicarboxylic acid component comprising:
    (i) 70 to 100 mole % of terephthalic acid residues;
    (ii) 0 to 30 mole % of aromatic dicarboxylic acid residues having up to 20 carbon atoms; and
    (iii) 0 to 10 mole % of aliphatic dicarboxylic acid residues having up to 16 carbon atoms; and
  (b) a glycol component comprising:
(i) about 20 to about 80 mole % of ethylene glycol residues; and
(ii) about 20 to about 80 mole % of cyclohexanedimethanol residues;
(II) residues of at least one titanium compound; and
(III) at least one chelating phosphorus species, reaction products thereof, or mixtures thereof, represented by the structure:

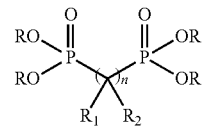

wherein:
n=an integer from 1 to 4;
R is hydrogen; and
R1 and R2 each can be hydrogen, $C_1$-$C_{22}$-alkyl, hydroxyl, or aryl;

wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
  (a) a dicarboxylic acid component comprising:
    (i) 70 to 100 mole % of terephthalic acid residues;
    (ii) 0 to 30 mole % of aromatic dicarboxylic acid residues having up to 20 carbon atoms; and
    (iii) 0 to 10 mole % of aliphatic dicarboxylic acid residues having up to 16 carbon atoms; and
  (b) a glycol component comprising:
    (i) about 60 to about 80 mole % of ethylene glycol residues; and
    (ii) about 20 to about 40 mole % of cyclohexanedimethanol residues;
(II) residues of at least one titanium compound; and
(III) at least one chelating phosphorus species, reaction products thereof, or mixtures thereof, represented by the structure:

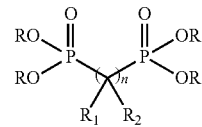

wherein:
n=an integer from 1 to 4;
R is hydrogen; and
R1 and R2 each can be hydrogen, $C_1$-$C_{22}$-alkyl, hydroxyl, or aryl;

wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
  (a) a dicarboxylic acid component comprising:
    (i) 70 to 100 mole % of terephthalic acid residues;

(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) greater than about 50 mole % of ethylene glycol residues; and
(ii) less than about 50 mole % of cyclohexanedimethanol residues;
(II) residues of at least one titanium compound; and
(III) at least one chelating phosphorus species, reaction products thereof, or mixtures thereof, represented by the structure:

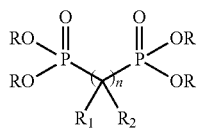

wherein:
n=an integer from 1 to 4;
R is hydrogen; and
R1 and R2 each can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 10 to about 90 mole % of ethylene glycol residues; and
(ii) about 10 to about 90 mole % of cyclohexanedimethanol residues;
(II) residues of at least one titanium compound; and
(III) at least one chelating phosphorus species, reaction products thereof, or mixtures thereof, represented by the structure:

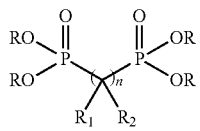

wherein:
n=an integer from 1 to 4;
R is $C_1$-$C_{22}$-alkyl; and
R1 and R2 each can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 20 to about 80 mole % of ethylene glycol residues; and
(ii) about 20 to about 80 mole % of cyclohexanedimethanol residues;
(II) residues of at least one titanium compound; and
(III) at least one chelating phosphorus species, reaction products thereof, or mixtures thereof, represented by the structure:

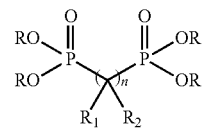

wherein:
n=an integer from 1 to 4;
R is $C_1$-$C_{22}$-alkyl; and
R1 and R2 each can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 60 to about 80 mole % of ethylene glycol residues; and
(ii) about 20 to about 40 mole % of cyclohexanedimethanol residues;
(II) residues of at least one titanium compound; and
(III) at least one chelating phosphorus species, reaction products thereof, or mixtures thereof, represented by the structure:

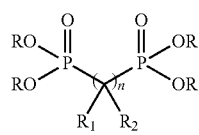

wherein:
n=an integer from 1 to 4;
R is $C_1$-$C_{22}$-alkyl; and
R1 and R2 each can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) greater than about 50 mole % of ethylene glycol residues; and
(ii) less than about 50 mole % of cyclohexanedimethanol residues;
(II) residues of at least one titanium compound; and
(III) at least one chelating phosphorus species, reaction products thereof, or mixtures thereof, represented by the structure:

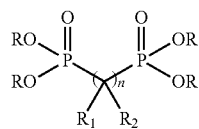

wherein:
n=an integer from 1 to 4;
R is $C_1$-$C_{22}$-alkyl; and
R1 and R2 each can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 10 to about 90 mole % of ethylene glycol residues; and
(ii) about 10 to about 90 mole % of cyclohexanedimethanol residues;
(II) residues of at least one titanium compound; and
(III) at least one chelating phosphorus species, reaction products thereof, or mixtures thereof, represented by the structure:

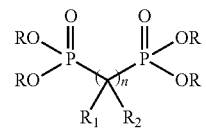

wherein:
n=an integer from 1 to 4;
R can be hydrogen or $C_1$-$C_{22}$-alkyl; and
R1 is hydroxyl; and R2 can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 20 to about 80 mole % of ethylene glycol residues; and
(ii) about 20 to about 80 mole % of cyclohexanedimethanol residues;
(II) residues of at least one titanium compound; and
(III) at least one chelating phosphorus species, reaction products thereof, or mixtures thereof, represented by the structure:

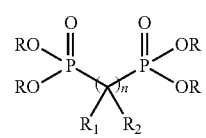

wherein:
n=an integer from 1 to 4;
R can be hydrogen or $C_1$-$C_{22}$-alkyl; and
R1 is hydroxyl; and R2 can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 60 to about 80 mole % of ethylene glycol residues; and
(ii) about 20 to about 40 mole % of cyclohexanedimethanol residues;
(II) residues of at least one titanium compound; and
(III) at least one chelating phosphorus species, reaction products thereof, or mixtures thereof, represented by the structure:

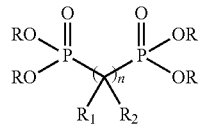

wherein:
n=an integer from 1 to 4;
R can be hydrogen or $C_1$-$C_{22}$-alkyl; and
R1 is hydroxyl; and R2 can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) greater than about 50 mole % of ethylene glycol residues; and
(ii) less than about 50 mole % of cyclohexanedimethanol residues;
(II) residues of at least one titanium compound; and
(III) at least one chelating phosphorus species, reaction products thereof, or mixtures thereof, represented by the structure:

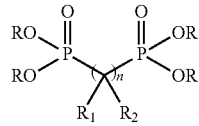

wherein:
n=an integer from 1 to 4;
R can be hydrogen or $C_1$-$C_{22}$-alkyl; and
R1 is hydroxyl; and R2 can be hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 10 to about 90 mole % of ethylene glycol residues; and
(ii) about 10 to about 90 mole % of cyclohexanedimethanol residues;
(II) residues of at least one titanium compound; and
(III) at least one chelating phosphorus species, reaction products thereof, or mixtures thereof, represented by the structure:

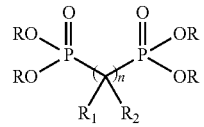

wherein:
n=an integer from 1 to 4;
R can be hydrogen or $C_1$-$C_{22}$-alkyl;
R1 can be hydrogen, $C_1$-$C_{22}$-alkyl, hydroxyl, or aryl; and
R2 is $C_1$-$C_{22}$-alkyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 20 to about 80 mole % of ethylene glycol residues; and
(ii) about 20 to about 80 mole % of cyclohexanedimethanol residues;
(II) residues of at least one titanium compound; and
(III) at least one chelating phosphorus species, reaction products thereof, or mixtures thereof, represented by the structure:

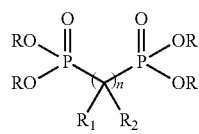

wherein:
n=an integer from 1 to 4;
R can be hydrogen or $C_1$-$C_{22}$-alkyl;
R1 can be hydrogen, $C_1$-$C_{22}$-alkyl, hydroxyl, or aryl; and
R2 is $C_1$-$C_{22}$-alkyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
  (a) a dicarboxylic acid component comprising:
    (i) 70 to 100 mole % of terephthalic acid residues;
    (ii) 0 to 30 mole % of aromatic dicarboxylic acid residues having up to 20 carbon atoms; and
    (iii) 0 to 10 mole % of aliphatic dicarboxylic acid residues having up to 16 carbon atoms; and
  (b) a glycol component comprising:
    (i) greater than about 50 mole % of ethylene glycol residues; and
    (ii) less than about 50 mole % of cyclohexanedimethanol residues;
(II) residues of at least one titanium compound; and
(III) at least one chelating phosphorus species, reaction products thereof, or mixtures thereof, represented by the structure:

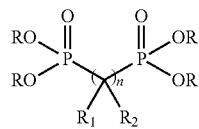

wherein:
n=an integer from 1 to 4;
R can be hydrogen or $C_1$-$C_{22}$-alkyl;
R1 can be hydrogen, $C_1$-$C_{22}$-alkyl, hydroxyl, or aryl; and
R2 is $C_1$-$C_{22}$-alkyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
  (a) a dicarboxylic acid component comprising:
    (i) 70 to 100 mole % of terephthalic acid residues;
    (ii) 0 to 30 mole % of aromatic dicarboxylic acid residues having up to 20 carbon atoms; and
    (iii) 0 to 10 mole % of aliphatic dicarboxylic acid residues having up to 16 carbon atoms; and
  (b) a glycol component comprising:
    (i) about 60 to about 80 mole % of ethylene glycol residues; and
    (ii) about 20 to about 40 mole % of cyclohexanedimethanol residues;
(II) residues of at least one titanium compound; and
(III) at least one chelating phosphorus species, reaction products thereof, or mixtures thereof, represented by the structure:

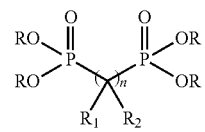

wherein:
n=an integer from 1 to 4;
R can be hydrogen or $C_1$-$C_{22}$-alkyl;
R1 can be hydrogen, $C_1$-$C_{22}$-alkyl, hydroxyl, or aryl; and
R2 is $C_1$-$C_{22}$-alkyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
  (a) a dicarboxylic acid component comprising:
    (i) 70 to 100 mole % of terephthalic acid residues;
    (ii) 0 to 30 mole % of aromatic dicarboxylic acid residues having up to 20 carbon atoms; and
    (iii) 0 to 10 mole % of aliphatic dicarboxylic acid residues having up to 16 carbon atoms; and
  (b) a glycol component comprising:
    (i) about 10 to about 90 mole % of ethylene glycol residues; and
    (ii) about 10 to about 90 mole % of cyclohexanedimethanol residues;
(II) residues of at least one titanium compound; and
(III) at least one chelating phosphorus species, reaction products thereof, or mixtures thereof, represented by the structure:

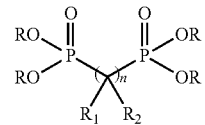

wherein:
n=an integer from 1 to 4;
R is hydrogen;
R1 is hydroxyl; and
R2 is $C_1$-$C_{22}$-alkyl;
wherein the total mole % of the dicarboxylic acid component is 100 mole %, wherein the total mole % of the glycol component is 100 mole %; and wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
 (a) a dicarboxylic acid component comprising:
  (i) 70 to 100 mole % of terephthalic acid residues;
  (ii) 0 to 30 mole % of aromatic dicarboxylic acid residues having up to 20 carbon atoms; and
  (iii) 0 to 10 mole % of aliphatic dicarboxylic acid residues having up to 16 carbon atoms; and
 (b) a glycol component comprising:
  (i) about 20 to about 80 mole % of ethylene glycol residues; and
  (ii) about 20 to about 80 mole % of cyclohexanedimethanol residues;
(II) residues of at least one titanium compound; and
(III) at least one chelating phosphorus species, reaction products thereof, or mixtures thereof, represented by the structure:

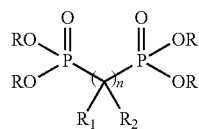

wherein:
n=an integer from 1 to 4;
R is hydrogen;
R1 is hydroxyl; and
R2 is $C_1$-$C_{22}$-alkyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
 (a) a dicarboxylic acid component comprising:
  (i) 70 to 100 mole % of terephthalic acid residues;
  (ii) 0 to 30 mole % of aromatic dicarboxylic acid residues having up to 20 carbon atoms; and
  (iii) 0 to 10 mole % of aliphatic dicarboxylic acid residues having up to 16 carbon atoms; and
 (b) a glycol component comprising:
  (i) about 60 to about 80 mole % of ethylene glycol residues; and
  (ii) about 20 to about 40 mole % of cyclohexanedimethanol residues;
(II) residues of at least one titanium compound; and
(III) at least one chelating phosphorus species, reaction products thereof, or mixtures thereof, represented by the structure:

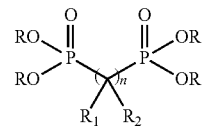

wherein:
n=an integer from 1 to 4;
R is hydrogen;
R1 is hydroxyl; and
R2 is $C_1$-$C_{22}$-alkyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
 (a) a dicarboxylic acid component comprising:
  (i) 70 to 100 mole % of terephthalic acid residues;
  (ii) 0 to 30 mole % of aromatic dicarboxylic acid residues having up to 20 carbon atoms; and
  (iii) 0 to 10 mole % of aliphatic dicarboxylic acid residues having up to 16 carbon atoms; and
 (b) a glycol component comprising:
  (i) greater than about 50 mole % of ethylene glycol residues; and
  (ii) less than about 50 mole % of cyclohexanedimethanol residues;
(II) residues of at least one titanium compound; and
(III) at least one chelating phosphorus species, reaction products thereof, or mixtures thereof, represented by the structure:

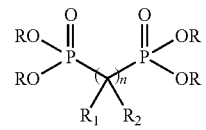

wherein:
n=an integer from 1 to 4;
R is hydrogen;
R1 is hydroxyl; and
R2 is $C_1$-$C_{22}$-alkyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
 (a) a dicarboxylic acid component comprising:
  (i) 70 to 100 mole % of terephthalic acid residues;
  (ii) 0 to 30 mole % of aromatic dicarboxylic acid residues having up to 20 carbon atoms; and
  (iii) 0 to 10 mole % of aliphatic dicarboxylic acid residues having up to 16 carbon atoms; and (b) a glycol component comprising:
  (i) about 10 to about 90 mole % of ethylene glycol residues; and
  (ii) about 10 to about 90 mole % of cyclohexanedimethanol residues;
(II) residues of at least one titanium compound; and
(III) at least one chelating phosphorus species, reaction products thereof, or mixtures thereof, represented by the structure:

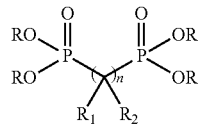

wherein:
n=an integer from 1 to 4;
R is hydrogen;
R1 is hydroxyl; and
R2 is methyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
  (a) a dicarboxylic acid component comprising:
    (i) 70 to 100 mole % of terephthalic acid residues;
    (ii) 0 to 30 mole % of aromatic dicarboxylic acid residues having up to 20 carbon atoms; and
    (iii) 0 to 10 mole % of aliphatic dicarboxylic acid residues having up to 16 carbon atoms; and
  (b) a glycol component comprising:
    (i) about 20 to about 80 mole % of ethylene glycol residues; and
    (ii) about 20 to about 80 mole % of cyclohexanedimethanol residues;
(II) residues of at least one titanium compound; and
(III) at least one chelating phosphorus species, reaction products thereof, or mixtures thereof, represented by the structure:

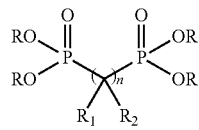

wherein:
n=an integer from 1 to 4;
R is hydrogen;
R1 is hydroxyl; and
R2 is methyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
  (a) a dicarboxylic acid component comprising:
    (i) 70 to 100 mole % of terephthalic acid residues;
    (ii) 0 to 30 mole % of aromatic dicarboxylic acid residues having up to 20 carbon atoms; and
    (iii) 0 to 10 mole % of aliphatic dicarboxylic acid residues having up to 16 carbon atoms; and
  (b) a glycol component comprising:
    (i) about 60 to about 80 mole % of ethylene glycol residues; and
    (ii) about 20 to about 40 mole % of cyclohexanedimethanol residues;
(II) residues of at least one titanium compound; and
(III) at least one chelating phosphorus species, reaction products thereof, or mixtures thereof, represented by the structure:

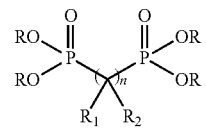

wherein:
n=an integer from 1 to 4;
R is hydrogen;
R1 is hydroxyl; and
R2 is methyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
  (a) a dicarboxylic acid component comprising:
    (i) 70 to 100 mole % of terephthalic acid residues;
    (ii) 0 to 30 mole % of aromatic dicarboxylic acid residues having up to 20 carbon atoms; and
    (iii) 0 to 10 mole % of aliphatic dicarboxylic acid residues having up to 16 carbon atoms; and
  (b) a glycol component comprising:
    (i) greater than about 50 mole % of ethylene glycol residues; and
    (ii) less than about 50 mole % of cyclohexanedimethanol residues;
(II) residues of at least one titanium compound; and
(III) at least one chelating phosphorus species, reaction products thereof, or mixtures thereof, represented by the structure:

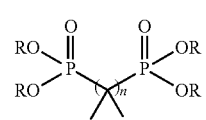

wherein:
n=an integer from 1 to 4;
R is hydrogen;
R1 is hydroxyl; and
R2 is methyl;

wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 10 to about 90 mole % of ethylene glycol residues; and
(ii) about 10 to about 90 mole % of cyclohexanedimethanol residues;
(II) residues of at least one titanium compound; and
(III) at least one chelating phosphorus species, reaction products thereof, or mixtures thereof, represented by the structure:

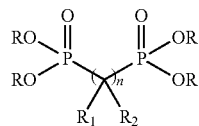

wherein:
n=1;
R is hydrogen;
R1 is hydroxyl; and
R2 is methyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 20 to about 80 mole % of ethylene glycol residues; and
(ii) about 20 to about 80 mole % of cyclohexanedimethanol residues;
(II) residues of at least one titanium compound; and
(III) at least one chelating phosphorus species, reaction products thereof, or mixtures thereof, represented by the structure:

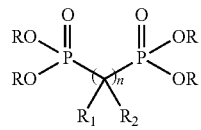

wherein:
n=1;
R is hydrogen;
R1 is hydroxyl; and
R2 is methyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 60 to about 80 mole % of ethylene glycol residues; and
(ii) about 20 to about 40 mole % of cyclohexanedimethanol residues;
(II) residues of at least one titanium compound; and
(III) at least one chelating phosphorus species, reaction products thereof, or mixtures thereof, represented by the structure:

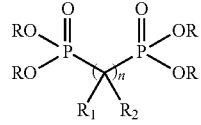

wherein:
n=1;
R is hydrogen;
R1 is hydroxyl; and
R2 is methyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and (b) a glycol component comprising:
(i) greater than about 50 mole % of ethylene glycol residues; and
(ii) less than about 50 mole % of cyclohexanedimethanol residues;
(II) residues of at least one titanium compound; and
(III) at least one chelating phosphorus species, reaction products thereof, or mixtures thereof, represented by the structure:

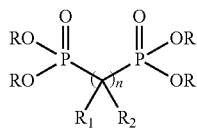

wherein:
n=1;
R is hydrogen;
R1 is hydroxyl; and
R2 is methyl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 10 to about 90 mole % of ethylene glycol residues; and
(ii) about 10 to about 90 mole % of cyclohexanedimethanol residues;
(II) residues of at least one titanium compound; and
(III) at least one chelating phosphorus species, reaction products thereof, or mixtures thereof, represented by the structure:

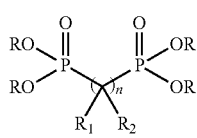

wherein:
n=an integer from 1 to 4;
R, R1 and R2 are each hydrogen;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 10 to about 90 mole % of ethylene glycol residues; and
(ii) about 10 to about 90 mole % of cyclohexanedimethanol residues;
(II) residues of at least one titanium compound; and
(III) at least one chelating phosphorus species, reaction products thereof, or mixtures thereof, represented by the structure:

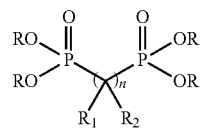

wherein:
n=2;
R, R1 and R2 are each hydrogen;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 20 to about 80 mole % of ethylene glycol residues; and
(ii) about 20 to about 80 mole % of cyclohexanedimethanol residues;
(II) residues of at least one titanium compound; and
(III) at least one chelating phosphorus species, reaction products thereof, or mixtures thereof, represented by the structure:

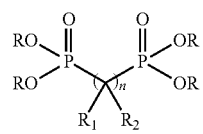

wherein:
n=2;
R, R1 and R2 are each hydrogen;

wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
  (a) a dicarboxylic acid component comprising:
    (i) 70 to 100 mole % of terephthalic acid residues;
    (ii) 0 to 30 mole % of aromatic dicarboxylic acid residues having up to 20 carbon atoms; and
    (iii) 0 to 10 mole % of aliphatic dicarboxylic acid residues having up to 16 carbon atoms; and
  (b) a glycol component comprising:
    (i) about 60 to about 80 mole % of ethylene glycol residues; and
    (ii) about 20 to about 40 mole % of cyclohexanedimethanol residues;
(II) residues of at least one titanium compound; and
(III) at least one chelating phosphorus species, reaction products thereof, or mixtures thereof, represented by the structure:

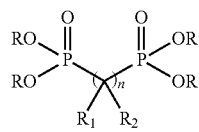

wherein:
n=2;
R, R1 and R2 are each hydrogen;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In one aspect, the invention provides a polyester composition comprising:
(I) at least one polyester which comprises:
  (a) a dicarboxylic acid component comprising:
    (i) 70 to 100 mole % of terephthalic acid residues;
    (ii) 0 to 30 mole % of aromatic dicarboxylic acid residues having up to 20 carbon atoms; and
    (iii) 0 to 10 mole % of aliphatic dicarboxylic acid residues having up to 16 carbon atoms; and
  (b) a glycol component comprising:
    (i) greater than about 50 mole % of ethylene glycol residues; and
    (ii) less than about 50 mole % of cyclohexanedimethanol residues;
(II) residues of at least one titanium compound; and
(III) at least one chelating phosphorus species, reaction products thereof, or mixtures thereof, represented by the structure:

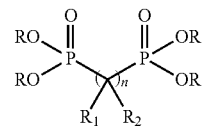

wherein:
n=2;
R, R1 and R2 are each hydrogen;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.

In certain embodiments of the invention, the titanium catalyst can be either substituted with or supplemented with a metal catalyst which does not contain titanium.

In certain embodiments, the ratios of phosphorus atoms to titanium atoms can be from 1:1 to 5:1.

In certain embodiments, the ratios of phosphorus atoms to titanium atoms can be from 2:1.

In one aspect, any of processes described herein for making the polyester compositions and/or polyesters comprise at least one of the chelating phosphorus species described herein.

In the blends of the invention, any of the polyester describe hereinabove or hereinbelow may be blend with at least one polymer component other than the polyesters of the invention.

In one aspect of the invention, a polymer blend is provided which comprises:
(A) a polyester composition comprising
  (I) at least one polyester (Polymer A) which comprises:
    (a) a dicarboxylic acid component comprising:
      (i) 70 to 100 mole % of terephthalic acid residues;
      (ii) 0 to 30 mole % of aromatic dicarboxylic acid residues having up to 20 carbon atoms; and
      (iii) 0 to 10 mole % of aliphatic dicarboxylic acid residues having up to 16 carbon atoms; and
    (b) a glycol component comprising:
      (i) about 10 to about 90 mole % of ethylene glycol residues; and
      (ii) about 90 to about 10 mole % of cyclohexanedimethanol residues;
  (II) residues of at least one titanium compound; and
  (III) at least one chelating phosphorus species, reaction products thereof, or mixtures thereof, represented by the structure:

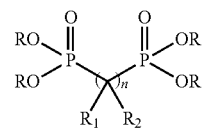

wherein:
n=an integer from 1 to 4;
R can be hydrogen or $C_1$-$C_{22}$-alkyl; and
R1 and R2 each can be hydrogen, $C_1$-$C_{22}$-alkyl, hydroxyl, or aryl;
wherein the total mole % of the dicarboxylic acid component is 100 mole %, wherein the total mole % of the glycol component is 100 mole %; and wherein the inherent viscosity of the polyester is from 0.35 to 1.2 dL/g as determined in 60/40 (wt/wt) phenol/tetrachloroethane at a concentration of 0.25 g/50 ml at 25° C.; and (B) at least one polymeric component other than Polymer A (Polymer B).

In one aspect of the invention, a polymer blend is provided which comprises:

(A) a polyester composition comprising
(I) at least one polyester (Polymer A) which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 10 to about 90 mole % of ethylene glycol residues; and
(ii) about 90 to about 10 mole % of cyclohexanedimethanol residues;
(II) residues of at least one titanium compound; and
(III) at least one chelating phosphorus species, reaction products thereof, or mixtures thereof, represented by the structure:

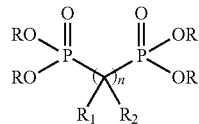

wherein:
n=an integer from 1 to 4;
R can be hydrogen or $C_1$-$C_{22}$-alkyl; and
R1 and R2 each can be hydrogen, $C_1$-$C_{22}$-alkyl, hydroxyl, or aryl;

wherein the total mole % of the dicarboxylic acid component is 100 mole %, wherein the total mole % of the glycol component is 100 mole %; and wherein the inherent viscosity of the polyester is from 0.35 to 1.2 dL/g as determined in 60/40 (wt/wt) phenol/tetrachloroethane at a concentration of 0.25 g/50 ml at 25° C.; and (B) at least one polycarbonate (Polymer B).

In one aspect of the invention, a polymer blend is provided which comprises:

(A) a polyester comprising
(I) at least one polyester (Polymer A) which comprises:
(a) a dicarboxylic acid component comprising:
(i) 70 to 100 mole % of terephthalic acid residues;
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 10 to about 90 mole % of ethylene glycol residues; and
(ii) about 90 to about 10 mole % of cyclohexanedimethanol residues;
(II) residues of at least one titanium compound; and
(III) at least one chelating phosphorus species, reaction products thereof, or mixtures thereof, represented by the structure:

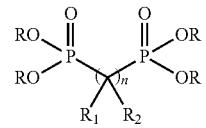

wherein:
n=an integer from 1 to 4;
R can be hydrogen or $C_1$-$C_{22}$-alkyl; and
R1 and R2 each can be hydrogen, $C_1$-$C_{22}$-alkyl, hydroxyl, or aryl;

wherein the total mole % of the dicarboxylic acid component is 100 mole %, wherein the total mole % of the glycol component is 100 mole %; and wherein the inherent viscosity of the polyester is from 0.35 to 1.2 dL/g as determined in 60/40 (wt/wt) phenol/tetrachloroethane at a concentration of 0.25 g/50 ml at 25° C.; and (B) at least one bisphenol A polycarbonate (Polymer B).

In another aspect of the invention, the polymer blend comprises about 40 weight % to about 80 weight % of Polymer A and about 20 to about 60 weight % of Polymer B, wherein the total weight percentages equal 100 weight % of the polymer blend.

In yet another aspect of the invention, the polymer blend comprises about 50 weight % to about 70 weight % of Polymer A and about 30 to about 50 weight % of Polymer B, wherein the total weight percentages equal 100 weight % of the polymer blend.

In one aspect, the polyester blends are useful in articles of manufacture including, but not limited to, extruded, calendered, and/or molded articles including, but not limited to, injection molded articles, extruded articles, cast extrusion articles, profile extrusion articles, melt spun articles, thermoformed articles, extrusion molded articles, injection blow molded articles, injection stretch blow molded articles, extrusion blow molded articles and extrusion stretch blow molded articles. These articles can include, but are not limited to, films, bottles, containers, sheet and/or fibers.

In one aspect, the polyester compositions useful in the invention may be used in various types of film and/or sheet, including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting.

DETAILED DESCRIPTION OF THE INVENTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

This invention relates to the use of a chelating phosphorus species in conjunction with a transition metal catalyst species to effect the synthesis of a polyester. The term "chelating phosphorus species" implies that two or more phosphorus atoms are tethered together by one or more linking atoms and that the geometry of the molecule is such that both phosphorus atoms can coordinate through a P—O-M bond to the catalyst metal used for polymerization, where M is a catalyst metal and, in one embodiment, can be titanium.

In one embodiment, the chelating phosphorus species is represented by Structure II as follows:

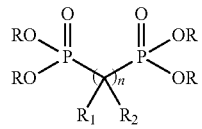

wherein:
n=an integer from 1 to 4;
R can be hydrogen or $C_1$-$C_{22}$-alkyl; and
R1 and R2 each can be hydrogen, $C_1$-$C_{22}$-alkyl, hydroxyl, or aryl.

In one embodiment, the chelating phosphorus species is represented by Structure I as follows:

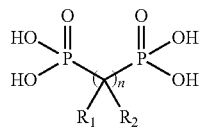

wherein:
n=an integer from 1 to 4; and
R1 and R2 each can be hydrogen, $C_1$-$C_{22}$-alkyl, hydroxyl, or aryl.

The term "aryl" is used herein to denote an aromatic radical containing 6, 10 or 14 carbon atoms in the conjugated aromatic ring structure and these radicals substituted with one or more groups selected from $C_1$-$C_6$-alkyl; $C_1$-$C_6$-alkoxy; phenyl, and phenyl substituted with $C_1$-$C_6$-alkyl; $C_1$-$C_6$-alkoxy; halogen and the like; $C_3$-$C_8$-cycloalkyl; halogen; hydroxy, cyano, trifluoromethyl and the like. Typical aryl groups can be phenyl, naphthyl, phenylnaphthyl, anthryl (anthracenyl) and the like.

The term "$C_1$-$C_{22}$-alkyl", as used herein, denotes a saturated hydrocarbon radical which contains one to twenty-two carbons and which may be straight or branched-chain. Such $C_1$-$C_{22}$ alkyl groups can be methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$-$C_{22}$-alkyl" refers to $C_1$-$C_{22}$-alkyl radicals as described above which may be substituted with one or more substituents selected from hydroxy, halogen, cyano, aryl, heteroaryl, $C_3$-$C_8$-cycloalkyl, substituted $C_3$-$C_8$-cycloalkyl, $C_1$-$C_6$-alkoxy, $C_2$-$C_6$ alkanoyloxy and the like.

The term "$C_3$-$C_8$-cycloalkyl", is used herein to denote a cycloaliphatic hydrocarbon radical containing three to eight carbon atoms. The term "substituted $C_3$-$C_8$-cycloalkyl" is used to describe a $C_3$-$C_8$-cycloalkyl radical as detailed above containing at least one group selected from $C_1$-$C_6$-alkyl, $C_1$-$C_6$-alkoxy, hydroxy, halogen, and the like.

The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2- and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1,3, 4-oxadiazol-2-yl, 1,3,4-thiadiazol-2-yl, 1,2,4-thiadiazol-5-yl, isothiazol-5-yl, imidazol-2-yl, quinolyl and the like.

The terms "$C_1$-$C_6$-alkoxy" and "$C_2$-$C_6$-alkanoyloxy" are used herein to represent the groups —O—$C_1$-$C_6$-alkyl and —OCOC$_1$-$C_6$-alkyl, respectively, wherein "$C_1$-$C_6$-alkyl" denotes a saturated hydrocarbon that contains 1-6 carbon atoms, which may be straight or branched-chain, and which may be further substituted with one or more groups selected from halogen, methoxy, ethoxy, phenyl, hydroxy, acetyloxy and propionyloxy. The term "halogen" is used to represent fluorine, chlorine, bromine, and iodine; however, chlorine and bromine are preferred.

The term "$C_2$-$C_{22}$-alkylene" is used herein to denote a divalent hydrocarbon radical that contains from two to twenty-two carbons and which may be straight or branched chain and which may be substituted with one or more substituents selected from hydroxy, halogen, $C_1$-$C_6$-alkoxy, $C_2$-$C_6$-alkanoyloxy and aryl. The term "$C_3$-$C_8$-cycloalkylene" is used herein to denote divalent cycloaliphatic radicals containing three to eight carbon atoms and these are optionally substituted with one or more $C_1$-$C_6$-alkyl groups. The term "arylene" is used to denote 1,2-, 1,3-, and 1,4-phenylene radicals and these optionally substituted with $C_1$-$C_6$-alkyl, $C_1$-$C_6$-alkoxy and halogen.

In one embodiment, the chelating phosphorus species is represented by Structure III as follows:

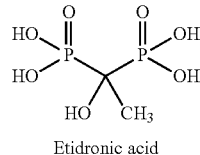

Etidronic acid

In one embodiment, the chelating phosphorus species is a dialkyl substituted diphosphinic acid. In another embodiment, the dialkyl substituted diphosphinic acid can be at least one of 1,2-ethylene diphosphonic acid, 1,2-butylene diphosphonic acid, P, P'-di(2-ethylhexyl)methanediphosphonic acid, P, P'-di(2-ethylhexyl)methanediphosphonic acid, and P, P'-di(2-ethylhexyl) butanediphosphonic acid.

In one embodiment, ratios of phosphorus atoms to titanium atoms can be from 1:1 to 5:1. In another embodiment, the ratio of phosphorus atoms to titanium atoms is 2:1. Note that a phosphorus to titanium atom ratio of 2:1 implies a phosphorus species to titanium species ratio of 1:1.

In one embodiment, the invention involves the use of dialkyl substituted diphosphonic acid in conjunction with a Ti(IV) catalyst such as titanium tetraisopropoxide, for polyester synthesis, in a ratio appropriate to allow for rapid polymerization but at the same time attenuating polymer color more so than an un-tethered phosphorus compound such as merpol A. Merpol A is a phosphate ester commercially available from Stepan Chemical Co and/or E.I. duPont de Nemours & Co. The CAS Registry number for Merpol A is believed to be CAS Registry #37208-27-8.

In embodiment, the improvement to color is reduction of yellowness.

The titanium compounds useful in this invention include any compound containing titanium including but not limited to: tetraethyl titanate, titanium tetraethylate, acetyltripropyl titanate, tetrapropyl titanate, tetrabutyl titanate, polybutyl titanate, 2-ethylhexyltitanate, octyleneglycol titanate, lactate titanate, triethanolamine titanate, acetyl triisopropyl titanate, titanium tetra-isopropylate, acetylacetonate titanate, ethylacetoacetic ester titanate, isostearyl titanate, acetyl triisopropyl titanate, titanium tetraisopropoxide, titanium glycolates, titanium butoxide, hexylene glycol titanate, and tetraisooctyl titanate, titanium dioxide, titanium dioxide/silicon dioxide coprecipitates, and titanium dioxide/zirconium dioxide coprecipitates. This invention includes but is not limited to the titanium dioxide/silicon dioxide coprecipitate catalyst described in U.S. Pat. No. 6,559,272.

The polymer compositions consist of terephthalic acid-based copolyesters which contain as major glycol components ethylene glycol and cyclohexane dimethanol, but may also include modifying glycols such as 2,2,4,4-tetramethyl-1,3-cyclobutanediol (TMCD).

In one embodiment of the invention, the copolyester comprises greater than 50 mole % ethylene glycol and less than 50 mole % 1,4-cyclohexanedimethanol, wherein the total mole % of the dicarboxylic acid component is 100 mole %, and wherein the total mole % of the glycol component is 100 mole %.

In one embodiment of the invention, the copolyester comprises 10 to 90 mole % ethylene glycol and 10 to 90 mole % 1,4-cyclohexanedimethanol, wherein the total mole % of the dicarboxylic acid component is 100 mole %, and wherein the total mole % of the glycol component is 100 mole %.

In one embodiment of the invention, the copolyester comprises 20 to 80 mole % ethylene glycol and 20 to 80 mole % 1,4-cyclohexanedimethanol, wherein the total mole % of the dicarboxylic acid component is 100 mole %, and wherein the total mole % of the glycol component is 100 mole %.

In one embodiment of the invention, the copolyester comprises 40 to 80 mole % ethylene glycol and 20 to 60 mole % 1,4-cyclohexanedimethanol, wherein the total mole % of the dicarboxylic acid component is 100 mole %, and wherein the total mole % of the glycol component is 100 mole %.

In one embodiment of the invention, the copolyester comprises 50 to 80 mole % ethylene glycol and 20 to 50 mole % 1,4-cyclohexanedimethanol, wherein the total mole % of the dicarboxylic acid component is 100 mole %, and wherein the total mole % of the glycol component is 100 mole %.

In one embodiment of the invention, the copolyester comprises 60 to 80 mole % ethylene glycol and 20 to 40 mole % 1,4-cyclohexanedimethanol, wherein the total mole % of the dicarboxylic acid component is 100 mole %, and wherein the total mole % of the glycol component is 100 mole %.

In one embodiment of the invention, the copolyester comprises 60 to 75 mole % ethylene glycol and 25 to 40 mole % 1,4-cyclohexanedimethanol, wherein the total mole % of the dicarboxylic acid component is 100 mole %, and wherein the total mole % of the glycol component is 100 mole %.

In some of the embodiments of the invention, the polyesters have a unique combination of the properties of good color and good processability. In some embodiments, the polymer lines can be run at faster speeds and/or higher temperatures and still achieve good color.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically the difunctional carboxylic acid can be a dicarboxylic acid and the difunctional hydroxyl compound can be a dihydric alcohol such as, for example, glycols and diols. The term "glycol" as used herein includes, but is not limited to, diols, glycols, and/or multifunctional hydroxyl compounds, for example, branching agents Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make polyester.

The polyesters used in the present invention typically can be prepared from dicarboxylic acids and diols which react in substantially equal proportions and are incorporated into the polyester polymer as their corresponding residues. The polyesters of the present invention, therefore, can contain substantially equal molar proportions of acid residues (100 mole %) and diol (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % isophthalic acid, based on the total acid residues, means the polyester contains 30 mole % isophthalic acid residues out of a total of 100 mole % acid residues. Thus, there are 30 moles of isophthalic acid residues among every 100 moles of acid residues. In another example, a polyester containing 30 mole % 1,4-cyclohexanedimethanol, based on the total diol residues, means the polyester contains 30 mole % 1,4-cyclohexanedimethanol residues out of a total of 100 mole % diol residues. Thus, there are 30 moles of 1,4-cyclohexanedimethanol residues among every 100 moles of diol residues.

In other aspects of the invention, the Tg of the polyesters useful in the polyester compositions of the invention can be at least one of the following ranges: 60 to 200° C.; 60 to 190° C.; 60 to 180° C.; 60 to 170° C.; 60 to 160° C.; 60 to 155° C.; 60 to 150° C.; 60 to 145° C.; 60 to 140° C.; 60 to 138° C.; 60 to 135° C.; 60 to 130° C.; 60 to 125° C.; 60 to 120° C.; 60 to 115° C.; 60 to 110° C.; 60 to 105° C.; 60 to 100° C.; 60 to 95° C.; 60 to 90° C.; 60 to 85° C.; 60 to 80° C.; 60 to 75° C.; 65 to 200° C.; 65 to 190° C.; 65 to 180° C.; 65 to 170° C.; 65 to 160° C.; 65 to 155° C.; 65 to 150° C.; 65 to 145° C.; 65 to 140° C.; 65 to 138° C.; 65 to 135° C.; 65 to 130° C.; 65 to 125° C.; 65 to 120° C.; 65 to 115° C.; 65 to 110° C.; 65 to 105° C.; 65 to 100° C.; 65 to 95° C.; 65 to 90° C.; 65 to 85° C.; 65 to 80° C.; 65 to 75° C.; 70 to 200° C.; 70 to 190° C.; 70 to 180° C.; 70 to 170° C.; 70 to 160° C.; 70 to 155° C.; 70 to 150° C.; 70 to 145° C.; 70 to 140° C.; 70 to 138° C.; 70 to 135° C.; 70 to 130° C.; 70 to 125° C.; 70 to 120° C.; 70 to 115° C.; 70 to 110° C.; 70 to 105° C.; 70 to 100° C.; 70 to 95° C.; 70 to 90° C.; 70 to 85° C.; 70 to 80° C.; 70 to 75° C.; 75 to 200° C.; 75 to 190° C.; 75 to 180° C.; 75 to 170° C.; 75 to 160° C.; 75 to 155° C.; 75 to 150° C.; 75 to 145° C.; 75 to 140° C.; 75 to 138° C.; 75 to 135° C.; 75 to 130° C.; 75 to 125° C.; 75 to 120° C.; 75 to 115° C.; 75 to 110° C.; 75 to 105° C.; 75 to 100° C.; 75 to 95° C.; 75 to 90° C.; 75 to 85° C.; 75 to 80° C.; 80 to 200° C.; 80 to 190° C.; 80 to 180° C.; 80 to 170° C.; 80 to 160° C.; 80 to 155° C.; 80 to 150° C.; 80 to 145° C.; 80 to 140° C.; 80 to 138° C.; 80 to 135° C.; 80 to 130° C.; 80 to 125° C.; 80 to 120° C.; 80 to 115° C.; 80 to 110° C.; 80 to 105° C.; 80 to 100° C.; 80 to 95° C.; 80 to 90° C.; 80 to 85° C.; 85 to 200° C.; 85 to 190° C.; 85 to 180° C.; 85 to 170° C.; 85 to 160° C.; 85 to 155° C.; 85 to 150° C.; 85 to 145° C.; 85 to 140° C.; 85 to 138° C.; 85 to 135° C.; 85 to 130° C.; 85 to 125° C.; 85 to 120° C.; 85 to 115° C.; 85 to 110° C.; 85 to 105° C.; 85 to 100° C.; 85 to 95° C.; 85 to 90° C.; 90 to 200° C.; 90 to 190° C.; 90 to 180° C.; 90 to 170° C.; 90 to 160° C.; 90 to 155° C.; 90 to 150° C.; 90 to 145° C.; 90 to 140° C.; 90 to 138° C.; 90 to 135° C.; 90 to 130° C.; 90 to 125° C.; 90 to 120° C.; 90 to 115° C.; 90 to 110° C.; 90 to 105° C.; 90 to 100° C.; 90 to 95° C.; 95 to 200° C.; 95 to 190° C.; 95 to 180° C.; 95 to 170° C.; 95 to 160° C.; 95 to 155° C.; 95 to 150° C.; 95 to 145° C.; 95 to 140° C.; 95 to 138° C.; 95 to 135° C.; 95 to 130° C.; 95 to 125° C.; 95 to 120° C.; 95 to 115° C.; 95 to 110° C.; 95 to 105° C.; 95 to 100° C.; 100 to 200° C.; 100 to 190° C.; 100 to 180° C.; 100 to 170° C.; 100 to 160° C.; 100 to 155° C.; 100 to 150° C.; 100 to 145° C.; 100 to 140° C.; 100 to 138° C.; 100 to 135° C.; 100 to 130° C.; 100 to 125° C.; 100 to 120° C.; 100 to 115° C.; 100 to 110° C.; 105 to 200° C.; 105 to 190° C.; 105 to 180° C.; 105 to 170° C.; 105 to 160° C.; 105 to 155° C.; 105 to 150° C.; 105 to 145° C.; 105 to 140° C.; 105 to 138° C.; 105 to 135° C.; 105 to 130° C.; 105 to 125° C.; 105 to 120° C.; 105 to 115° C.; 105 to 110° C.; 110 to 200° C.; 110 to 190° C.; 110 to 180° C.; 110 to 170° C.; 110 to 160° C.; 110 to 155° C.; 110 to 150° C.; 110 to 145° C.; 110 to 140° C.; 110 to 138° C.; 110 to 135° C.; 110 to 130° C.; 110 to 125° C.; and 110 to 120° C.

In other aspects of the invention, the glycol component for the polyesters useful in the invention include but are not limited to at least one of the following combinations of ranges: 10 to 90 mole % ethylene glycol and 10 to 90 mole % cyclohexanedimethanol; 10 to 85 mole % ethylene glycol and 15 to 90 mole % cyclohexanedimethanol; 10 to 80 mole % ethylene glycol and 20 to 90 mole % cyclohexanedimethanol; 10 to 75 mole % ethylene glycol and 25 to 90 mole % cyclohexanedimethanol; 10 to 70 mole % ethylene glycol and 30 to 90 mole % cyclohexanedimethanol; 10 to 65 mole % ethylene glycol and 35 to 90 mole % cyclohexanedimethanol; 10 to 60 mole % ethylene glycol and 40 to 90 mole % cyclohexanedimethanol; 10 to 55 mole % ethylene glycol and 45 to 90 mole % cyclohexanedimethanol; and 10 to 50 mole % ethylene glycol and 50 to 90 mole % cyclohexanedimethanol.

In other aspects of the invention, the glycol component for the polyesters useful in the invention include but are not limited to at least one of the following combinations of ranges: 15 to 90 mole % ethylene glycol and 10 to 85 mole % cyclohexanedimethanol; 15 to 85 mole % ethylene glycol and 15 to 85 mole % cyclohexanedimethanol; 15 to 80 mole % ethylene glycol and 20 to 85 mole % cyclohexanedimethanol; 15 to 75 mole % ethylene glycol and 25 to 85 mole % cyclohexanedimethanol; 15 to 70 mole % ethylene glycol and 30 to 85 mole % cyclohexanedimethanol; 15 to 65 mole % ethylene glycol and 35 to 85 mole % cyclohexanedimethanol; 15 to 60 mole % ethylene glycol and 40 to 85 mole % cyclohexanedimethanol; 15 to 55 mole % ethylene glycol and 45 to 85 mole % cyclohexanedimethanol; and 15 to 50 mole % ethylene glycol and 50 to 85 mole % cyclohexanedimethanol.

In other aspects of the invention, the glycol component for the polyesters useful in the invention include but are not limited to at least one of the following combinations of ranges: 20 to 90 mole % ethylene glycol and 10 to 80 mole % cyclohexanedimethanol; 20 to 85 mole % ethylene glycol and 15 to 80 mole % cyclohexanedimethanol; 20 to 80 mole % ethylene glycol and 20 to 80 mole % cyclohexanedimethanol; 20 to 75 mole % ethylene glycol and 25 to 80 mole % cyclohexanedimethanol; 20 to 70 mole % ethylene glycol and 30 to 80 mole % cyclohexanedimethanol; 20 to 65 mole % ethylene glycol and 35 to 80 mole % cyclohexanedimethanol; 20 to 60 mole % ethylene glycol and 40 to 80 mole % cyclohexanedimethanol; 20 to 55 mole % ethylene glycol and 45 to 80 mole % cyclohexanedimethanol; and 20 to 50 mole % ethylene glycol and 50 to 80 mole % cyclohexanedimethanol.

In other aspects of the invention, the glycol component for the polyesters useful in the invention include but are not limited to at least one of the following combinations of ranges: 25 to 90 mole % ethylene glycol and 10 to 75 mole % cyclohexanedimethanol; 25 to 85 mole % ethylene glycol and 15 to 75 mole % cyclohexanedimethanol; 25 to 80 mole % ethylene glycol and 20 to 75 mole % cyclohexanedimethanol; 25 to 75 mole % ethylene glycol and 25 to 75 mole % cyclohexanedimethanol; 25 to 70 mole % ethylene glycol and 30 to 75 mole % cyclohexanedimethanol; 25 to 65 mole % ethylene glycol and 35 to 75 mole % cyclohexanedimethanol; 25 to 60 mole % ethylene glycol and 40 to 75 mole % cyclohexanedimethanol; 25 to 55 mole % ethylene glycol and 45 to 74 mole % cyclohexanedimethanol; and 25 to 50 mole % ethylene glycol and 50 to 75 mole % cyclohexanedimethanol.

In other aspects of the invention, the glycol component for the polyesters useful in the invention include but are not limited to at least one of the following combinations of ranges: 30 to 90 mole % ethylene glycol and 10 to 70 mole % cyclohexanedimethanol; 30 to 85 mole % ethylene glycol and 15 to 70 mole % cyclohexanedimethanol; 30 to 80 mole % ethylene glycol and 20 to 70 mole % cyclohexanedimethanol; 30 to 75 mole % ethylene glycol and 25 to 70 mole % cyclohexanedimethanol; 30 to 70 mole % ethylene glycol and 30 to 70 mole % cyclohexanedimethanol; 30 to 65 mole % ethylene glycol and 35 to 70 mole % cyclohexanedimethanol; 30 to 60 mole % ethylene glycol and 40 to 70 mole % cyclohexanedimethanol; 30 to 55 mole % ethylene glycol and 45 to 70 mole % cyclohexanedimethanol; and 30 to 50 mole % ethylene glycol and 50 to 70 mole % cyclohexanedimethanol.

In other aspects of the invention, the glycol component for the polyesters useful in the invention include but are not limited to at least one of the following combinations of ranges: 35 to 90 mole % ethylene glycol and 10 to 65 mole % cyclohexanedimethanol; 35 to 85 mole % ethylene glycol and 15 to 65 mole % cyclohexanedimethanol; 35 to 80 mole % ethylene glycol and 20 to 65 mole % cyclohexanedimethanol; 35 to 75 mole % ethylene glycol and 25 to 65 mole % cyclohexanedimethanol; 35 to 70 mole % ethylene glycol and 30 to 65 mole % cyclohexanedimethanol; 35 to 65 mole % ethylene glycol and 35 to 65 mole % cyclohexanedimethanol; 35 to 60 mole % ethylene glycol and 40 to 65 mole % cyclohexanedimethanol; 35 to 55 mole % ethylene glycol and 45 to 65 mole % cyclohexanedimethanol; and 35 to 50 mole % ethylene glycol and 50 to 65 mole % cyclohexanedimethanol.

In other aspects of the invention, the glycol component for the polyesters useful in the invention include but are not limited to at least one of the following combinations of ranges: 40 to 90 mole % ethylene glycol and 10 to 60 mole % cyclohexanedimethanol; 40 to 85 mole % ethylene glycol and 15 to 60 mole % cyclohexanedimethanol; 40 to 80 mole % ethylene glycol and 20 to 60 mole % cyclohexanedimethanol; 40 to 75 mole % ethylene glycol and 25 to 60 mole % cyclohexanedimethanol; 40 to 70 mole % ethylene glycol and 30 to 60 mole % cyclohexanedimethanol; 40 to 65 mole % ethylene glycol and 35 to 60 mole % cyclohexanedimethanol; 40 to 60 mole % ethylene glycol and 40 to 60 mole % cyclohexanedimethanol; 40 to 55 mole % ethylene glycol and 45 to 60 mole % cyclohexanedimethanol; and 40 to 50 mole % ethylene glycol and 50 to 60 mole % cyclohexanedimethanol.

In other aspects of the invention, the glycol component for the polyesters useful in the invention include but are not limited to at least one of the following combinations of ranges: 45 to 90 mole % ethylene glycol and 10 to 55 mole % cyclohexanedimethanol; 45 to 85 mole % ethylene glycol and 15 to 55 mole % cyclohexanedimethanol; 45 to 80 mole % ethylene glycol and 20 to 55 mole % cyclohexanedimethanol; 45 to 75 mole % ethylene glycol and 25 to 55 mole % cyclohexanedimethanol; 45 to 70 mole % ethylene glycol and 30 to 55 mole % cyclohexanedimethanol; 45 to 65 mole % ethylene glycol and 35 to 55 mole % cyclohexanedimethanol; 45 to 60 mole % ethylene glycol and 40 to 55 mole % cyclohexanedimethanol; and 45 to 55 mole % ethylene glycol and 45 to 55 mole % cyclohexanedimethanol.

In other aspects of the invention, the glycol component for the polyesters useful in the invention include but are not limited to at least one of the following combinations of ranges: 50 to 90 mole % ethylene glycol and 10 to 50 mole % cyclohexanedimethanol; 50 to 85 mole % ethylene glycol and 15 to 50 mole % cyclohexanedimethanol; 50 to 80 mole % ethylene glycol and 20 to 50 mole % cyclohexanedimethanol; 50 to 75 mole % ethylene glycol and 25 to 50 mole % cyclohexanedimethanol; 50 to 70 mole % ethylene glycol and 30 to 50 mole % cyclohexanedimethanol; 50 to 65 mole % ethylene glycol and 35 to 50 mole % cyclohexanedimethanol; and 50 to 60 mole % ethylene glycol and 40 to 50 mole % cyclohexanedimethanol.

In other aspects of the invention, the glycol component for the polyesters useful in the invention include but are not limited to at least one of the following combinations of ranges: greater than 50 to 99 mole % ethylene glycol and 1 to less than 50 mole % cyclohexanedimethanol; greater than 50 to 95 mole % ethylene glycol and 5 to less than 50 mole % cyclohexanedimethanol; greater than 50 to 90 mole % ethylene glycol and 10 to less than 50 mole % cyclohexanedimethanol; greater than 50 to 85 mole % ethylene glycol and 15 to less than 50 mole % cyclohexanedimethanol; greater than 50 to 80 mole % ethylene glycol and 20 to less than 50 mole % cyclohexanedimethanol; greater than 50 to 75 mole % ethylene glycol and 25 to less than 50 mole % cyclohexanedimethanol; greater than 50 to 70 mole % ethylene glycol and 30 to less than 50 mole % cyclohexanedimethanol; greater than 50 to 65 mole % ethylene glycol and 35 to less than 50 mole % cyclohexanedimethanol; greater than 50 to 60 mole % ethylene glycol and 40 to less than 50 mole % cyclohexanedimethanol.

In other aspects of the invention, the glycol component for the polyesters useful in the invention include but are not limited to at least one of the following combinations of ranges: greater than 51 to 99 mole % ethylene glycol and 1 to less than 49 mole % cyclohexanedimethanol; greater than 51 to 95 mole % ethylene glycol and 5 to less than 49 mole % cyclohexanedimethanol; greater than 51 to 90 mole % ethylene glycol and 10 to less than 49 mole % cyclohexanedimethanol; greater than 51 to 85 mole % ethylene glycol and 15 to less than 49 mole % cyclohexanedimethanol; greater than 51 to 80 mole % ethylene glycol and 20 to less than 49 mole % cyclohexanedimethanol; greater than 51 to 75 mole % ethylene glycol and 25 to less than 49 mole % cyclohexanedimethanol; greater than 51 to 70 mole % ethylene glycol and 30 to less than 49 mole % cyclohexanedimethanol; greater than 51 to 65 mole % ethylene glycol and 35 to less than 49 mole % cyclohexanedimethanol; greater than 51 to 60 mole % ethylene glycol and 40 to less than 49 mole % cyclohexanedimethanol.

In other aspects of the invention, the glycol component for the polyesters useful in the invention include but are not limited to at least one of the following combinations of ranges: 55 to 99 mole % ethylene glycol and 1 to 45 mole % cyclohexanedimethanol; 55 to 95 mole % ethylene glycol and 5 to 45 mole % cyclohexanedimethanol; 55 to 90 mole % ethylene glycol and 10 to 45 mole % cyclohexanedimethanol; 55 to 85 mole % ethylene glycol and 15 to 45 mole % cyclohexanedimethanol; 55 to 80 mole % ethylene glycol and 20 to 45 mole % cyclohexanedimethanol; 55 to 75 mole % ethylene glycol and 25 to 45 mole % cyclohexanedimethanol; 55 to 70 mole % ethylene glycol and 30 to 45 mole % cyclohexanedimethanol; 55 to 65 mole % ethylene glycol and 35 to 45 mole % cyclohexanedimethanol; and 55 to 60 mole % ethylene glycol and 40 to 45 mole % cyclohexanedimethanol.

In other aspects of the invention, the glycol component for the polyesters useful in the invention include but are not limited to at least one of the following combinations of ranges: 60 to 99 mole % ethylene glycol and 1 to 40 mole % cyclohexanedimethanol; 60 to 95 mole % ethylene glycol and 5 to 40 mole % cyclohexanedimethanol; 60 to 90 mole % ethylene glycol and 10 to 40 mole % cyclohexanedimethanol; 60 to 85 mole % ethylene glycol and 15 to 40 mole % cyclohexanedimethanol; 60 to 80 mole % ethylene glycol and 20 to 40 mole % cyclohexanedimethanol; 60 to 75 mole % ethylene glycol and 25 to 40 mole % cyclohexanedimethanol; and 60 to 70 mole % ethylene glycol and 30 to 40 mole % cyclohexanedimethanol.

In other aspects of the invention, the glycol component for the polyesters useful in the invention include but are not limited to at least one of the following combinations of ranges: 65 to 99 mole % ethylene glycol and 1 to 35 mole % cyclohexanedimethanol; 65 to 95 mole % ethylene glycol and 5 to 35 mole % cyclohexanedimethanol; 65 to 90 mole % ethylene glycol and 10 to 35 mole % cyclohexanedimethanol; 65 to 85 mole % ethylene glycol and 15 to 35 mole % cyclohexanedimethanol; 65 to 80 mole % ethylene glycol and 20 to 35 mole % cyclohexanedimethanol; 65 to 75 mole % ethylene glycol and 25 to 35 mole % cyclohexanedimethanol; and 65 to 70 mole % ethylene glycol and 30 to 35 mole % cyclohexanedimethanol.

In other aspects of the invention, the glycol component for the polyesters useful in the invention include but are not limited to at least one of the following combinations of ranges: 70 to 99 mole % ethylene glycol and 1 to 30 mole % cyclohexanedimethanol; 70 to 95 mole % ethylene glycol and 5 to 30 mole % cyclohexanedimethanol; 70 to 90 mole % ethylene glycol and 10 to 30 mole % cyclohexanedimethanol; 70 to 85 mole % ethylene glycol and 15 to 30 mole % cyclohexanedimethanol; 70 to 80 mole % ethylene glycol and 20 to 30 mole % cyclohexanedimethanol; 70 to 75 mole % ethylene glycol and 25 to 30 mole % cyclohexanedimethanol.

In other aspects of the invention, the glycol component for the polyesters useful in the invention include but are not limited to at least one of the following combinations of ranges: 75 to 99 mole % ethylene glycol and 1 to 25 mole % cyclohexanedimethanol; 75 to 95 mole % ethylene glycol and 5 to 25 mole % cyclohexanedimethanol; 75 to 90 mole % ethylene glycol and 10 to 25 mole % cyclohexanedimethanol; and 75 to 85 mole % ethylene glycol and 15 to 25 mole % cyclohexanedimethanol.

In other aspects of the invention, the glycol component for the polyesters useful in the invention include but are not limited to at least one of the following combinations of ranges: 80 to 99 mole % ethylene glycol and 1 to 20 mole % cyclohexanedimethanol; 80 to 95 mole % ethylene glycol and 5 to 20 mole % cyclohexanedimethanol; 80 to 90 mole % ethylene glycol and 10 to 20 mole % cyclohexanedimethanol.

For embodiments of the invention, the polyesters useful in the invention may exhibit at least one of the following inherent viscosities as determined in 60/40 (wt/wt) phenol/tetrachloroethane at a concentration of 0.25 g/50 ml at 25° C.: 0.10 to 1.2 dL/g; 0.35 to 1.2 dL/g; 0.50 to 1.2 dL/g; 0.50 to 1.1 dL/g; 0.50 to 1 dL/g; 0.50 to less than 1 dL/g; 0.50 to 0.98 dL/g; 0.50 to 0.95 dL/g; 0.50 to 0.90 dL/g; 0.50 to 0.85 dL/g; 0.50 to 0.80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.55 to 1.2 dL/g; 0.55 to 1.1 dL/g; 0.55 to 1 dL/g; 0.55 to less than 1 dL/g; 0.55 to 0.98 dL/g; 0.55 to 0.95 dL/g; 0.55 to 0.90 dL/g; 0.55 to 0.85 dL/g; 0.55 to 0.80 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.65 dL/g; 0.60 to 1.2 dL/g; 0.60 to 1.1 dL/g; 0.60 to 1 dL/g; 0.60 to less than 1 dL/g; 0.60 to 0.98 dL/g; 0.60 to 0.95 dL/g; 0.60 to 0.90 dL/g; 0.60 to 0.85 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.65 to 1.2 dL/g; 0.65 to 1.1 dL/g; 0.65 to 1 dL/g; 0.65 to less than 1 dL/g; 0.65 to 0.98 dL/g; 0.65 to 0.95 dL/g; 0.65 to 0.90 dL/g; 0.65 to 0.85 dL/g; 0.65 to 0.80 dL/g; 0.65 to 0.75 dL/g; 0.65 to less than 0.75 dL/g; 0.65 to 0.72 dL/g;

It is contemplated that compositions useful in the invention can possess at least one of the inherent viscosity ranges described herein and at least one of the monomer ranges for the compositions described herein unless otherwise stated. It is also contemplated that compositions useful in the invention can possess at least one of the Tg ranges described herein and at least one of the monomer ranges for the compositions described herein unless otherwise stated. It is also contemplated that compositions useful in the invention can possess at least one of the inherent viscosity ranges described herein, at least one of the Tg ranges described herein, and at least one of the monomer ranges for the compositions described herein unless otherwise stated.

In one embodiment, terephthalic acid may be used as the starting material. In another embodiment, dimethyl terephthalate may be used as the starting material. In yet another embodiment, mixtures of terephthalic acid and dimethyl terephthalate may be used as the starting material and/or as an intermediate material.

In certain embodiments, terephthalic acid or an ester thereof, such as, for example, dimethyl terephthalate or a mixture of terephthalic acid residues and an ester thereof can make up a portion or all of the dicarboxylic acid component used to form the polyesters useful in the invention. In certain embodiments, terephthalic acid residues can make up a portion or all of the dicarboxylic acid component used to form the polyesters useful in the invention. In certain embodiments, higher amounts of terephthalic acid can be used in order to produce a higher impact strength polyester. For purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present invention. In all embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acid, the dicarboxylic acid component of the polyester useful in the invention can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, 0.01 to 20 mole %, from 0.01 to 10 mole %, from 0.01 to 5 mole % and from 0.01 to 1 mole %. In one embodiment, modifying aromatic dicarboxylic acids that may be used in the present invention include but are not limited to those having up to 20 carbon atoms, and which can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the polyesters useful in the invention can be further modified with up to 10 mole %, such as up to 5 mole % or up to 1 mole % of one or more aliphatic dicarboxylic acids containing 2-16 carbon atoms, such as, for example, cyclohexanedicarboxylic, malonic, succinic, glutaric, adipic, pimelic, suberic, azelaic and dodecanedioic dicarboxylic acids. Certain embodiments can also comprise 0.01 to 10 mole %, such as 0.1 to 10 mole %, 1 or 10 mole %, 5 to 10 mole % of one or more modifying aliphatic dicarboxylic acids. Yet another embodiment contains 0 mole % modifying aliphatic dicarboxylic acids. The total mole % of the dicarboxylic acid component is 100 mole %. In one embodiment, adipic acid and/or glutaric acid are provided in the modifying aliphatic dicarboxylic acid component of the invention.

The modifying dicarboxylic acids of the invention can include indan dicarboxylic acids, for example, indan-1,3-dicarboxylic acids and/or phenylindan dicarboxylic acids. In one embodiment, the dicarboxylic acid may be chosen from at least one of 1,2,3-trimethyl-3-phenylindan-4',5-dicarboxylic acid and 1,1,3-trimethyl-5-carboxy-3-(4-carboxyphenyl) indan dicarboxylic acid. For the purposes of this invention, any of the indan dicarboxylic acids described in United States Patent Application Publication No. 2006/0004151A1 entitled "Copolymers Containing Indan Moieties and Blends Thereof" by Shaikh et al., assigned to General Electric Company may be used as at least one modifying dicarboxylic acid within the scope of this invention; United States Patent Application Publication No. 2006/0004151A1 is incorporated herein by reference with respect to any of the indan dicarboxylic acids described therein.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

For the desired polyester, the molar ratio of cis/trans 2,2,4,4-tetramethyl-1,3-cyclobutanediol can vary from the pure form of each and mixtures thereof. In certain embodiments, the molar percentages for cis and/or trans 2,2,4,4,-tetramethyl-1,3-cyclobutanediol are greater than 50 mole % cis and less than 50 mole % trans; or greater than 55 mole % cis and less than 45 mole % trans; or 30 to 70 mole % cis and 70 to 30 mole % trans; or 40 to 60 mole % cis and 60 to 40 mole % trans; or 50 to 70 mole % trans and 50 to 30 mole % cis; or 50 to 70 mole % cis and 50 to 30 mole % trans; or 60 to 70 mole % cis and 30 to 40 mole % trans; or greater than 70 mole % cis and less than 30 mole % trans; wherein the total mole percentages for cis- and trans-2,2,4,4-tetramethyl-1,3-cyclobutanediol is equal to 100 mole %. In an additional embodiment, the molar ratio of cis/trans 2,2,4,4-tetramethyl-1,3-cyclobutanediol can vary within the range of 50/50 to 0/100, for example, between 40/60 to 20/80.

The cyclohexanedimethanol may be cis, trans, or a mixture thereof, for example, a cis/trans ratio of 60:40 to 40:60 or a cis/trans ratio of 70:30 to 30:70. In another embodiment, the trans-cyclohexanedimethanol can be present in an amount of 60 to 80 mole % and the cis-cyclohexanedimethanol can be present in an amount of 20 to 40 mole % wherein the total percentages of cis-cyclohexanedimethanol and trans-cyclohexanedimethanol is equal to 100 mole %. In particular embodiments, the trans-cyclohexanedimethanol can be present in an amount of 60 mole % and the cis-cyclohexanedimethanol can be present in an amount of 40 mole %. In particular embodiments, the trans-cyclohexanedimethanol can be present in an amount of 70 mole % and the cis-cyclohexanedimethanol can be present in an amount of 30 mole %. Any of 1,1-, 1,2-, 1,3-, 1,4-isomers of cyclohexanedimethanol or mixtures thereof may be present in the glycol component of this invention. In one embodiment, the polyesters useful in the invention comprise 1,4-cyclohexanedimethanol. In another embodiment, the polyesters useful in the invention comprise 1,4-cyclohexanedimethanol and 1,3-cyclohexanedimethanol. The molar ratio of cis/trans 1,4-cyclohexanedimethanol can vary within the range of 50/50 to 0/100, for example, between 40/60 to 20/80.

In one embodiment, the glycol component of the polyester portion of the polyester compositions useful in the invention can contain modifying glycols which are not ethylene glycol or cyclohexanedimethanol; in one embodiment, the glycol component of the polyester portion of the polyester compositions useful in the invention can contain less than 45 mole % of one or more modifying glycols which are not ethylene glycol or cyclohexanedimethanol; in one embodiment, the glycol component of the polyester portion of the polyester compositions useful in the invention can contain 30 mole % or less of one or more modifying glycols which are not ethylene glycol or cyclohexanedimethanol; in one embodiment, the glycol component of the polyester portion of the polyester compositions useful in the invention can contain 25 mole % or less of one or more modifying glycols which are not ethylene glycol or cyclohexanedimethanol; in one embodiment, the glycol component of the polyester portion of the polyester compositions useful in the invention can contain 20 mole % or less of one or more modifying glycols which are not ethylene glycol or cyclohexanedimethanol; in one embodiment, the polyesters useful in the invention may contain less than 15 mole % or of one or more modifying glycols. In another embodiment, the polyesters useful in the invention can contain 10 mole % or less of one or more modifying glycols. In another embodiment, the polyesters useful in the invention can contain 5 mole % or less of one or more modifying glycols. In another embodiment, the polyesters useful in the invention can contain 3 mole % or less of one or more modifying glycols. In another embodiment, the polyesters useful in the invention can contain 0 mole % modifying glycols.

In one embodiment, the glycol component of the polyester portion of the polyester compositions useful in the invention can contain modifying glycols which is 2,2,4,4-tetramethyl-1,3-cyclobutanediol; in one embodiment, the glycol component of the polyester portion of the polyester compositions useful in the invention can contain less than 45 mole % of 2,2,4,4-tetramethyl-1,3-cyclobutanediol residues; in one embodiment, the glycol component of the polyester portion of the polyester compositions useful in the invention can contain 30 mole % or less of 2,2,4,4-tetramethyl-1,3-cyclobutanediol residues; in one embodiment, the glycol component of the polyester portion of the polyester compositions useful in the invention can contain 25 mole % or less of 2,2,4,4-tetramethyl-1,3-cyclobutanediol residues; in one embodiment, the glycol component of the polyester portion of the polyester compositions useful in the invention can contain 20 mole % or less of 2,2,4,4-tetramethyl-1,3-cyclobutanediol residues; in one embodiment, the polyesters useful in the invention may contain less than 15 mole % of 2,2,4,4-tetramethyl-1,3-cyclobutanediol residues. In another embodiment, the polyesters useful in the invention can contain 10 mole % or less of 2,2,4,4-tetramethyl-1,3-cyclobutanediol residues. In another embodiment, the polyesters useful in the invention can contain 5 mole % or less of 2,2,4,4-tetramethyl-1,3-cyclobutanediol residues. In another embodiment, the polyesters useful in the invention can contain 3 mole % or less of 2,2,4,4-tetramethyl-1,3-cyclobutanediol residues. In another embodiment, the polyesters useful in the invention can contain 0 mole % of 2,2,4,4-tetramethyl-1,3-cyclobutanediol residues.

Certain embodiments of the polyesters in the invention can also contain 0.01 to 45 mole %, 0.01 to 40 mole %, 0.01 to 35 mole %, 0.01 to 30 mole %, 0.01 to 25 mole %, 0.01 to 20 mole %, 0.01 to 15 mole %, 0.01 to 10 mole %, 0.01 to 5 mole %, of one or more modifying glycols. Any of these embodiments can contain 2,2,4,4-tetramethyl-1,3-cyclobutanediol as the modifying glycol.

Certain embodiments of the polyesters in the invention can also contain 1 to 45 mole %, 1 to 40 mole %, 1 to 35 mole %, 1 to 30 mole %, 1 to 25 mole %, 1 to 20 mole %, 1 to 15 mole %, 1 to 10 mole %, 1 to 5 mole %, of one or more modifying glycols. Any of these embodiments can contain 2,2,4,4-tetramethyl-1,3-cyclobutanediol as the modifying glycol.

Certain embodiments of the polyesters in the invention can also contain 5 to 45 mole %, 5 to 40 mole %, 5 to 35 mole %, 5 to 30 mole %, 5 to 25 mole %, 5 to 20 mole %, 5 to 15 mole %, 5 to 10 mole %, of one or more modifying glycols. Any of these embodiments can contain 2,2,4,4-tetramethyl-1,3-cyclobutanediol as the modifying glycol.

Certain embodiments of the polyesters in the invention can also contain 10 to 45 mole %, 10 to 40 mole %, 10 to 35 mole %, 10 to 30 mole %, to 25 mole %, 10 to 20 mole %, of one or more modifying glycols. Any of these embodiments can contain 2,2,4,4-tetramethyl-1,3-cyclobutanediol as the modifying glycol.

Certain embodiments of the polyesters in the invention can also contain 15 to 45 mole %, 15 to 40 mole %, 15 to 35 mole %, 15 to 30 mole %, to 25 mole %, of one or more modifying glycols. Any of these embodiments can contain 2,2,4,4-tetramethyl-1,3-cyclobutanediol as the modifying glycol.

Certain embodiments of the polyesters in the invention can also contain 20 to 45 mole %, 20 to 40 mole %, 20 to 35 mole %, 20 to 30 mole %, of one or more modifying glycols. Any of these embodiments can contain 2,2,4,4-tetramethyl-1,3-cyclobutanediol as the modifying glycol.

Certain embodiments of the polyesters in the invention can also contain 25 to 45 mole %, 25 to 40 mole %, 25 to 35 mole %, of one or more modifying glycols. Any of these embodiments can contain 2,2,4,4-tetramethyl-1,3-cyclobutanediol as the modifying glycol.

Certain embodiments of the polyesters in the invention can also contain 30 to 45 mole %, 30 to 40 mole %, 30 to 35 mole %, of one or more modifying glycols. Any of these embodiments can contain 2,2,4,4-tetramethyl-1,3-cyclobutanediol as the modifying glycol.

Modifying glycols useful in the polyesters useful in the invention refer to diols other than ethylene glycol and cyclohexanedimethanol and can contain 2 to 16 carbon atoms. Examples of suitable modifying glycols include, but are not limited to, 2,2,4,4-tetramethyl-1,3-cyclobutanediol residues, 1,2-propanediol, 1,3-propanediol, neopentyl glycol, 1,4-butanediol, 1,5-pentanediol, 1,6-hexanediol, p-xylene glycol, polytetramethylene glycol, and mixtures thereof. In another embodiment, the modifying glycols include, but are not limited to, at least one of 1,3-propanediol and 1,4-butanediol. In another embodiment, 1,3-propanediol and 1,4-butanediol are excluded as modifying diols. Again, in any of the aforementioned ranges of modifying glycols, 2,2,4,4-tetramethyl-1,3-cyclobutanediol can be the modifying glycol.

The polyesters and/or the polycarbonates useful in the polyesters compositions of the invention can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The polyester(s) useful in the invention can thus be linear or branched. The polycarbonate can also be linear or branched. In certain embodiments, the branching monomer or agent may be added prior to and/or during and/or after the polymerization of the polycarbonate.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

The polyesters of the invention can comprise at least one chain extender. Suitable chain extenders include, but are not limited to, multifunctional (including, but not limited to, bifunctional) isocyanates, multifunctional epoxides, including for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 percent by weight to about 10 percent by weight, such as about 0.1 to about 5 percent by weight, based on the total weight of the polyester.

The glass transition temperature (Tg) of the polyesters useful in the invention was determined using a TA DSC 2920 from Thermal Analyst Instrument at a scan rate of 20° C./min.

Polyesters useful in the present invention, can be used to produce articles of manufacture, including but not limited to, injection molded parts, injection blow molded articles, injection stretch blow molded articles, extruded film, extruded sheet, extrusion blow molded articles, extrusion stretch blow molded articles, and fibers. A thermoformable sheet is an example of an article of manufacture provided by this invention.

The polyesters of the invention can be amorphous or semicrystalline. In one aspect, certain polyesters useful in the invention can have relatively low crystallinity. Certain polyesters useful in the invention can thus have a substantially amorphous morphology, meaning that the polyesters comprise substantially unordered regions of polymer.

In one embodiment, an "amorphous" polyester can have a crystallization half-time of greater than 5 minutes at 170° C. or greater than 10 minutes at 170° C. or greater than 50 minutes at 170° C. or greater than 100 minutes at 170° C. In one embodiment, of the invention, the crystallization half-times can be greater than 1,000 minutes at 170° C. In another embodiment of the invention, the crystallization half-times of the polyesters useful in the invention can be greater than 10,000 minutes at 170° C. The crystallization half time of the polyester, as used herein, may be measured using methods well-known to persons of skill in the art. For example, the crystallization half time of the polyester, t ½, can be determined by measuring the light transmission of a sample via a laser and photo detector as a function of time on a temperature controlled hot stage. This measurement can be done by exposing the polymers to a temperature, Tmax, and then cooling it to the desired temperature. The sample can then be held at the desired temperature by a hot stage while transmission measurements are made as a function of time. Initially, the sample can be visually clear with high light transmission and becomes opaque as the sample crystallizes. The crystallization half-time is the time at which the light transmission is halfway between the initial transmission and the final transmission. Tmax is defined as the temperature required to melt the crystalline domains of the sample (if crystalline domains are present). The sample can be heated to Tmax to condition the sample prior to crystallization half time measurement. The absolute Tmax temperature is different for each composition. For example PCT can be heated to some temperature greater than 290° C. to melt the crystalline domains.

In one embodiment, certain polyesters useful in this invention can be visually clear. The term "visually clear" is defined herein as an appreciable absence of cloudiness, haziness, and/or muddiness, when inspected visually. In another embodiment, when the polyesters are blended with polycarbonate, including but not limited to, bisphenol A polycarbonates, the blends can be visually clear.

In other embodiments of the invention, the polyesters useful in the invention may have a yellowness index (ASTM D-1925) of less than 50 or less than 20.

In one embodiment, the polyesters useful in the invention and/or the polyester compositions of the invention and/or the polyester blends, with or without toners, can have color values L*, a* and b* which can be determined using a Hunter Lab Ultrascan Spectra Colorimeter manufactured by Hunter Associates Lab Inc., Reston, Va. The color determinations are averages of values measured on either pellets of the polyesters or plaques or other items injection molded or extruded from them. They are determined by the L*a*b* color system of the CIE (International Commission on Illumination) (translated), wherein L* represents the lightness coordinate, a* represents the red/green coordinate, and b* represents the yellow/blue coordinate. In certain embodiments, the b* values for the polyesters useful in the invention can be from −10 to less than 10 and the L* values can be from 50 to 90. In other embodiments, the b* values for the polyesters or polyester compositions or polymer blends useful in the invention can be present in one of the following ranges: from −10 to 9; −10 to 8; −10 to 7; −10 to 6; −10 to 5; −10 to 4; −10 to 3; −10 to 2; from −5 to 9; −5 to 8; −5 to 7; −5 to 6; −5 to 5; −5 to 4; −5 to 3; −5 to 2; 0 to 9; 0 to 8; 0 to 7; 0 to 6; 0 to 5; 0 to 4; 0 to 3; 0 to 2; 1 to 10; 1 to 9; 1 to 8; 1 to 7; 1 to 6; 1 to 5; 1 to 4; 1 to 3; and 1 to 2. In other embodiments, the L* value for the polyesters or polyester compositions or polymer blends useful in the invention can be present in one of the following ranges: 50 to 60; 50 to 70; 50 to 80; 50 to 90; 60 to 70; 60 to 80; 60 to 90; 70 to 80; 79 to 90.

Amounts of chelating phosphorus species added during polymerization or post manufacturing can include but are not limited to: 1 to 5000 ppm; 1 to 1000 ppm, 1 to 900 ppm, 1 to 800 ppm, 1 to 700 ppm. 1 to 600 ppm, 1 to 500 ppm, 1 to 400 ppm, 1 to 350 ppm, 1 to 300 ppm, 1 to 250 ppm, 1 to 200 ppm, 1 to 150 ppm, 1 to 100 ppm; 10 to 5000 ppm; 10 to 1000 ppm, 10 to 900 ppm, 10 to 800 ppm, 10 to 700 ppm. 10 to 600 ppm, 10 to 500 ppm, 10 to 400 ppm, 10 to 350 ppm, 10 to 300 ppm, 10 to 250 ppm, 10 to 200 ppm, 10 to 150 ppm, 10 to 100 ppm; based on the total weight of the polyester composition.

In one embodiment, amounts of chelating phosphorus species of the invention added during polymerization are chosen from the following: 1 to 5000 ppm; 1 to 1000 ppm, 1 to 900 ppm, 1 to 800 ppm, 1 to 700 ppm. 1 to 600 ppm, 1 to 500 ppm, 1 to 400 ppm, 1 to 350 ppm, 1 to 300 ppm, 1 to 250 ppm, 1 to 200 ppm, 1 to 150 ppm, 1 to 100 ppm; 1 to 60 ppm; 2 to 5000 ppm; 2 to 1000 ppm, 2 to 900 ppm, 2 to 800 ppm, 2 to 700 ppm. 2 to 600 ppm, 2 to 500 ppm, 2 to 400 ppm, 2 to 350 ppm, 2 to 300 ppm, 2 to 250 ppm, 2 to 200 ppm, 2 to 150 ppm, 2 to 100 ppm; 2 to 60 ppm; 2 to 20 ppm, 3 to 5000 ppm; 3 to 1000 ppm, 3 to 900 ppm, 3 to 800 ppm, 3 to 700 ppm. 3 to 600 ppm, 3 to 500 ppm, 3 to 400 ppm, 3 to 350 ppm, 3 to 300 ppm, 3 to 250 ppm, 3 to 200 ppm, 3 to 150 ppm, 3 to 100 ppm; 3 to 60 ppm; 3 to 20 ppm, 4 to 5000 ppm; 4 to 1000 ppm, 4 to 900 ppm, 4 to 800 ppm, 4 to 700 ppm, 4 to 600 ppm, 4 to 500 ppm, 4 to 400 ppm, 4 to 350 ppm, 4 to 300 ppm, 4 to 250 ppm, 4 to 200 ppm, 4 to 150 ppm, 4 to 100 ppm; 4 to 60 ppm; 4 to 20 ppm, 5 to 5000 ppm; 5 to 1000 ppm, 5 to 900 ppm, 5 to 800 ppm, 5 to 700 ppm, 5 to 600 ppm, 5 to 500 ppm, 5 to 400 ppm, 5 to 350 ppm, 5 to 300 ppm, 5 to 250 ppm, 5 to 200 ppm, 5 to 150 ppm, 5 to 100 ppm; 5 to 60 ppm; 5 to 20 ppm, 6 to 5000 ppm; 6 to 1000 ppm, 6 to 900 ppm, 6 to 800 ppm, 6 to 700 ppm, 6 to 600 ppm, 6 to 500 ppm, 6 to 400 ppm, 6 to 350 ppm, 6 to 300 ppm, 6 to 250 ppm, 6 to 200 ppm, 6 to 150 ppm, 6 to 100 ppm; 6 to 60 ppm; 6 to 20 ppm, 7 to 5000 ppm; 7 to 1000 ppm, 7 to 900 ppm, 7 to 800 ppm, 7 to 700 ppm, 7 to 600 ppm, 7 to 500 ppm, 7 to 400 ppm, 7 to 350 ppm, 7 to 300 ppm, 7 to 250 ppm, 7 to 200 ppm, 7 to 150 ppm, 7 to 100 ppm; 7 to 60 ppm; 7 to 20 ppm, 8 to 5000 ppm; 8 to 1000 ppm, 8 to 900 ppm, 8 to 800 ppm, 8 to 700 ppm, 8 to 600 ppm, 8 to 500 ppm, 8 to 400 ppm, 8 to 350 ppm, 8 to 300 ppm, 8 to 250 ppm, 8 to 200 ppm, 8 to 150 ppm, 8 to 100 ppm; 8 to 60 ppm; 8 to 20 ppm, 9 to 5000 ppm; 9 to 1000 ppm, 9 to 900 ppm, 9 to 800 ppm, 9 to 700 ppm, 9 to 600 ppm, 9 to 500 ppm, 9 to 400 ppm, 9 to 350 ppm, 9 to 300 ppm, 9 to 250 ppm, 9 to 200 ppm, 9 to 150 ppm, 9 to 100 ppm; 9 to 60 ppm; 9 to 20 ppm, 10 to 5000 ppm; 10 to 1000 ppm, 10 to 900 ppm, 10 to 800 ppm, 10 to 700 ppm. 10 to 600 ppm, 10 to 500 ppm, 10 to 400 ppm, 10 to 350 ppm, 10 to 300 ppm, 10 to 250 ppm, 10 to 200 ppm, 10 to 150 ppm, 10 to 100 ppm, 10 to 60 ppm, 10 to 20 ppm, 50 to 5000 ppm, 50 to 1000 ppm, 50 to 900 ppm, 50 to 800 ppm, 50 to 700 ppm, 50 to 600 ppm, 50 to 500 ppm, 50 to 400 ppm, 50 to 350 ppm, 50 to 300 ppm, 50 to 250 ppm, 50 to 200 ppm, 50 to 150 ppm, 50 to 100 ppm; 50 to 80 ppm, 100 to 5000 ppm, 100 to 1000 ppm, 100 to 900 ppm, 100 to 800 ppm, 100 to 700 ppm, 100 to 600 ppm, 100 to 500 ppm, 100 to 400 ppm, 100 to 350 ppm, 100 to 300 ppm, 100 to 250 ppm, 100 to 200 ppm, 100 to 150 ppm; 150 to 5000 ppm, 150 to 1000 ppm, 150 to 900 ppm, 150 to 800 ppm, 150 to 700 ppm, 150 to 600 ppm, 150 to 500 ppm, 150 to 400 ppm, 150 to 350 ppm, 150 to 300 ppm, 150 to 250 ppm, 150 to 200 ppm, 200 to 5000 ppm, 200 to 1000 ppm, 200 to 900 ppm, 200 to 800 ppm, 200 to 700 ppm, 200 to 600 ppm, 200 to 500 ppm, 200 to 400 ppm, 200 to 350 ppm, 200 to 300 ppm, 200 to 250 ppm, 250 to 5000 ppm, 250 to 1000 ppm, 250 to 900 ppm, 250 to 800 ppm, 250 to 700 ppm, 250 to 600 ppm, 250 to 500 ppm, 250 to 400 ppm, 250 to 350 ppm, 250 to 300 ppm, 500 to 5000 ppm, 300 to 1000 ppm, 300 to 900 ppm, 300 to 800 ppm, 300 to 700 ppm, 300 to 600 ppm, 300 to 500 ppm, 300 to 400 ppm, 300 to 350 ppm, 350 to 5000 ppm, 350 to 1000 ppm, 350 to 900 ppm, 350 to 800 ppm, 350 to 700 ppm, 350 to 600 ppm, 350 to 500 ppm, 350 to 400 ppm; based on the total weight of the polyester and as measured in the form of phosphorus atoms in the final polyester.

The invention further relates to a polymer blend which can comprise any amount of the polyesters useful in the invention blended with any other polymer. In one embodiment, the blend comprises:
(a) from 0 to 95 weight % of at least one of the polyesters described above (Polymer A); and
(b) from 5 to 100 weight % of at least one of polymeric components (Polymer B).

In one embodiment, the blend comprises:
(a) from 0.01 to 95 weight % of at least one of the polyesters described above (Polymer A); and
(b) from 0.01 to 95 weight % of at least one of polymeric components (Polymer B).

In one embodiment, the blend comprises:
(a) from 5 to 95 weight % of at least one of the polyesters (Polymer A) described above; and
(b) from 5 to 95 weight % of at least one of polymeric components (Polymer B).

The polymer blend can include components other than Polymers A and B. In addition, when Polymer B is a polycarbonate, the total weight % of Polymers A and B is 100 weight percent of Polymers A and B. If other components besides Polymers A and B (where polymer B is polycarbonate) are added to the polymer blend, the total weight of all components will equal 100 weight percent of the total polymer blend. In one embodiment, if an article of manufacture contains the polymer blend, it is contemplated that some articles of manufacture may have portions that contain the polymer blend and portions that do not contain the polymer blend. In another embodiment, it is also contemplated that an article of manufacture can be manufactured from only the polymer blend.

In certain embodiments, the polymer blends of the invention can comprise: 5 to 90 weight % of Polymer A and 10 to 95 weight of Polymer B; 5 to 85 weight % of Polymer A and 15 to 90 weight % of Polymer B; 10 to 80 weight % of Polymer A and 20 to 95 weight % of Polymer B; 5 to 75 weight % of Polymer A and 25 to 95 weight % of Polymer B; 5 to 70 weight % of Polymer A and 30 to 95 weight % of Polymer B; 5 to 65 weight % of Polymer A and 35 to 95 weight % of Polymer B; 5 to 60 weight % of Polymer A and 40 to 95 weight % of Polymer B; 5 to 55 weight % of Polymer A and 45 to 95 weight % of Polymer B; and 5 to 50 weight % of Polymer A and 50 to 95 weight % of Polymer B.

In certain embodiments, the polymer blends of the invention can include but are not limited to at least one of the following combinations of ranges: 10 to 90 weight % of Polymer A and 10 to 90 weight of Polymer B; 10 to 85 weight % of Polymer A and 15 to 90 weight % of Polymer B; 10 to 80 weight % of Polymer A and 20 to 90 weight % of Polymer B; 10 to 75 weight % of Polymer A and 25 to 90 weight % of Polymer B; 10 to 70 weight % of Polymer A and 30 to 90 weight % of Polymer B; 10 to 65 weight % of Polymer A and 35 to 90 weight % of Polymer B; 10 to 60 weight % of Polymer A and 40 to 90 weight % of Polymer B; 10 to 55 weight % of Polymer A and 45 to 90 weight % of Polymer B; and 10 to 50 weight % of Polymer A and 50 to 90 weight % of Polymer B.

In certain embodiments, the polymer blends of the invention can include but are not limited to at least one of the following combinations of ranges: 15 to 90 weight % of Polymer A and 10 to 85 weight % of Polymer B; 15 to 85 weight % of Polymer A and 15 to 85 weight % of Polymer B; 15 to 80 weight % of Polymer A of and 20 to 85 weight % of Polymer B; 15 to 75 weight % of Polymer A and 25 to 85 weight % of Polymer B; 15 to 70 weight % of Polymer A and 30 to 85 weight % of Polymer B; 15 to 65 weight % of Polymer A and 35 to 85 weight % of Polymer B; 15 to 60 weight % of Polymer A and 40 to 85 weight % of Polymer B; 15 to 55 weight % of Polymer A and 45 to 85 weight % of Polymer B; and 15 to 50 weight % of Polymer A and 50 to 85 weight % of Polymer B.

In certain embodiments, the polymer blends of the invention can include but are not limited to at least one of the following combinations of ranges: 20 to 90 weight % of Polymer A and 10 to 80 weight % of Polymer B; 20 to 85 weight % of Polymer A and 15 to 80 weight % of Polymer B; 20 to 80 weight % of Polymer A and 20 to 80 weight % of Polymer B; 20 to 75 weight % of Polymer A and 25 to 80 weight % of Polymer B; 20 to 70 weight % of Polymer A and 30 to 80 weight % of Polymer B; 20 to 65 weight % of Polymer A and 35 to 80 weight % of Polymer B; 20 to 60 mole % of Polymer A and 40 to 80 mole % of Polymer B; 20 to 55 mole % of Polymer A and 45 to 80 mole % of Polymer B; and 20 to 50 mole of Polymer A and 50 to 80 mole % of Polymer B.

In certain embodiments, the polymer blends of the invention can include but are not limited to at least one of the following combinations of ranges: 25 to 90 weight % of Polymer A and 10 to 75 weight % of Polymer B; 25 to 85 weight % of Polymer A and 15 to 75 weight % of Polymer B; 25 to 80 weight % of Polymer A and 20 to 75 weight % of Polymer B; 25 to 75 weight % of Polymer A and 25 to 75 weight % of Polymer B; 25 to 70 weight % of Polymer A and 30 to 75 weight % of Polymer B; 25 to 65 weight % of Polymer A and 35 to 75 weight % of Polymer B; 25 to 60 weight % of Polymer A and 40 to 75 weight % of Polymer B; 25 to 55 weight % of Polymer A and 45 to 74 weight % of Polymer B; and 25 to 50 weight % of Polymer A and 50 to 75 weight % of Polymer B.

In certain embodiments, the polymer blends of the invention can include but are not limited to at least one of the following combinations of ranges: 30 to 90 weight % of Polymer A and 10 to 70 weight % of Polymer B; 30 to 85 weight % of Polymer A and 15 to 70 weight % of Polymer B; 30 to 80 weight % of Polymer A and 20 to 70 weight % of Polymer B; 30 to 75 weight % of Polymer A and 25 to 70 weight % of Polymer B; 30 to 70 weight % of Polymer A and 30 to 70 weight % of Polymer B; 30 to 65 weight % of Polymer A and 35 to 70 weight % of Polymer B; 30 to 60 weight % of Polymer A and 40 to 70 weight % of Polymer B; 30 to 55 weight % of Polymer A and 45 to 70 weight % of Polymer B; and 30 to 50 weight % of Polymer A and 50 to 70 weight % of Polymer B.

In certain embodiments, the polymer blends of the invention can include but are not limited to at least one of the following combinations of ranges: 35 to 90 weight % of Polymer A and 10 to 65 weight % of Polymer B; 35 to 85 weight % of Polymer A and 15 to 65 weight % of Polymer B; 35 to 80 weight % of Polymer A and 20 to 65 weight % of Polymer B; 35 to 75 weight % of Polymer A and 25 to 65 weight % of Polymer B; 35 to 70 weight % of Polymer A and 30 to 65 weight % of Polymer B; 35 to 65 weight % of Polymer A and 35 to 65 weight % of Polymer B; 35 to 60 weight % of Polymer A and 40 to 65 weight % of Polymer B; 35 to 55 weight % of Polymer A and 45 to 65 weight % of Polymer B; and 35 to 50 weight % of Polymer A and 50 to 65 weight % of Polymer B.

In certain embodiments, the polymer blends of the invention can include but are not limited to at least one of the following combinations of ranges: 40 to 90 weight % of Polymer A and 10 to 60 weight % of Polymer B; 40 to 85 weight % of Polymer A and 15 to 60 weight % of Polymer B; 40 to 80 weight % of Polymer A and 20 to 60 weight % of Polymer B; 40 to 75 weight % of Polymer A and 25 to 60 weight % of Polymer B; 40 to 70 weight % of Polymer A and 30 to 60 weight % of Polymer B; 40 to 65 weight % of Polymer A and 35 to 60 weight % of Polymer B; 40 to 60 weight % of Polymer A and 40 to 60 weight % of Polymer B; 40 to 55 weight % of Polymer A and 45 to 60 weight % of Polymer B; and 40 to 50 weight % of Polymer A and 50 to 60 weight % of Polymer B.

In certain embodiments, the polymer blends of the invention can include but are not limited to at least one of the following combinations of ranges: 45 to 90 weight % of Polymer A and 10 to 55 weight % of Polymer B; 45 to 85 weight % of Polymer A and 15 to 55 weight % of Polymer B; 45 to 80 weight % of Polymer A and 20 to 55 weight % of Polymer B; 45 to 75 weight % of Polymer A and 25 to 55 weight % of Polymer B; 45 to 70 weight % of Polymer A and 30 to 55 weight % of Polymer B; 45 to 65 weight % of Polymer A and 35 to 55 weight % of Polymer B; 45 to 60 weight % of Polymer A and 40 to 55 weight % of Polymer B; and 45 to 55 weight % of Polymer A and 45 to 55 weight % of Polymer B.

In certain embodiments, the polymer blends of the invention can include but are not limited to at least one of the following combinations of ranges: 50 to 90 weight % of Polymer A and 10 to 50 weight % of Polymer B; 50 to 85 weight % of Polymer A and 15 to 50 weight % of Polymer B; 50 to 80 weight % of Polymer A and 20 to 50 weight % of Polymer B; 50 to 75 weight % of Polymer A and 25 to 50 weight % of Polymer B; 50 to 70 weight % of Polymer A and 30 to 50 weight % of Polymer B; 50 to 65 weight % of Polymer A and 35 to 50 weight % of Polymer B; and 50 to 60 weight % of Polymer A and 40 to 50 weight % of Polymer B.

In certain embodiments, the polymer blends of the invention can include but are not limited to at least one of the following combinations of ranges: greater than 50 to 99 weight % of Polymer A and 1 to less than 50 weight % of Polymer B; greater than 50 to 95 weight % of Polymer A and 5 to less than 50 weight % of Polymer B; greater than 50 to 90 weight % of Polymer A and 10 to less than 50 weight % of Polymer B; greater than 50 to 85 weight % of Polymer A and 15 to less than 50 weight % of Polymer B; greater than 50 to 80 weight % of Polymer A and 20 to less than 50 weight % of Polymer B; greater than 50 to 75 weight % of Polymer A and 25 to less than 50 weight % of Polymer B; greater than 50 to 70 weight % of Polymer A and 30 to less than 50 weight % of Polymer B; greater than 50 to 65 weight % of Polymer A and 35 to less than 50 weight % of Polymer B; greater than 50 to 60 weight % of Polymer A and 40 to less than 50 weight % of Polymer B.

In certain embodiments, the polymer blends of the invention can include but are not limited to at least one of the following combinations of ranges: greater than 51 to 99 weight % of Polymer A and 1 to less than 49 weight % of Polymer B; greater than 51 to 95 weight % of Polymer A and 5 to less than 49 weight % of Polymer B; greater than 51 to 90 weight % of Polymer A and 10 to less than 49 weight % of Polymer B; greater than 51 to 85 weight % of Polymer A and 15 to less than 49 weight % of Polymer B; greater than 51 to 80 weight % of Polymer A and 20 to less than 49 weight % of Polymer B; greater than 51 to 75 weight % of Polymer A and 25 to less than 49 weight % of Polymer B; greater than 51 to 70 weight % of Polymer A and 30 to less than 49 weight % of Polymer B; greater than 51 to 65 weight % of Polymer A and 35 to less than 49 weight % of Polymer B; greater than 51 to 60 weight % of Polymer A and 40 to less than 49 weight % of Polymer B.

In certain embodiments, the polymer blends of the invention can include but are not limited to at least one of the following combinations of ranges: 55 to 99 weight % of Polymer A and 1 to 45 weight % of Polymer B; 55 to 95 weight % of Polymer A and 5 to 45 weight % of Polymer B; 55 to 90 weight % of Polymer A and 10 to 45 weight % of Polymer B; 55 to 85 weight % of Polymer A 15 to 45 weight % of Polymer B; 55 to 80 weight % of Polymer A and 20 to 45 weight % of Polymer B; 55 to 75 weight % of Polymer A and 25 to 45 weight % of Polymer B; 55 to 70 weight % of Polymer A and 30 to 45 weight % of Polymer B; 55 to 65 weight % of Polymer A and 35 to 45 weight % of Polymer B; and 55 to 60 weight % of Polymer A and 40 to 45 weight % of Polymer B.

In certain embodiments, the polymer blends of the invention can include but are not limited to at least one of the following combinations of ranges: 60 to 99 weight % of Polymer A and 1 to 40 weight % of Polymer B; 60 to 95 weight % of Polymer A and 5 to 40 weight % of Polymer B; 60 to 90 weight % of Polymer A and 10 to 40 weight % of Polymer B; 60 to 85 weight % of Polymer A and 15 to 40 weight % of Polymer B; 60 to 80 weight % of Polymer A and 20 to 40 weight % of Polymer B; 60 to 75 weight % of Polymer A and 25 to 40 weight % of Polymer B; and 60 to 70 weight % of Polymer A and 30 to 40 weight % of Polymer B.

In certain embodiments, the polymer blends of the invention can include but are not limited to at least one of the following combinations of ranges: 65 to 99 weight % of Polymer A and 1 to 35 weight % of Polymer B; 65 to 95 weight % of Polymer A and 5 to 35 weight % of Polymer B; 65 to 90 weight % of Polymer A and 10 to 35 weight % of Polymer B; 65 to 85 weight % of Polymer A and 15 to 35 weight % of Polymer B; 65 to 80 weight % of Polymer A and 20 to 35 weight % of Polymer B; 65 to 75 weight % of Polymer A and 25 to 35 weight % of Polymer B; and 65 to 70 weight % of Polymer A and 30 to 35 weight % of Polymer B.

In certain embodiments, the polymer blends of the invention can include but are not limited to at least one of the following combinations of ranges: 70 to 99 weight % of Polymer A and 1 to 30 weight % of Polymer B; 70 to 95 weight % of Polymer A and 5 to 30 weight % of Polymer B; 70 to 90 weight % of Polymer A and 10 to 30 weight % of Polymer B; 70 to 85 weight % of Polymer A and 15 to 30 weight % of Polymer B; 70 to 80 weight % of Polymer A and 20 to 30 weight % of Polymer B; 70 to 75 weight % of Polymer A and 25 to 30 weight % of Polymer B.

In certain embodiments, the polymer blends of the invention can include but are not limited to at least one of the following combinations of ranges: 75 to 99 weight % of Polymer A and 1 to 25 weight % of Polymer B; 75 to 95 weight % of Polymer A and 5 to 25 weight % of Polymer B; 75 to 90 weight % of Polymer A and 10 to 25 weight % of Polymer B; and 75 to 85 weight % of Polymer A and 15 to 25 weight % of Polymer B.

In certain embodiments, the polymer blends of the invention can include but are not limited to at least one of the following combinations of ranges: 80 to 99 weight % of Polymer A and 1 to 20 weight % of Polymer B; 80 to 95 weight % of Polymer A and 5 to 20 weight % of Polymer B; 80 to 90 weight % of Polymer A and 10 to 20 weight % of Polymer B.

For any of the ranges noted for Polymer A and Polymer B, it is contemplated that Polymer B can be any polymer. For any of the ranges noted for Polymer A and Polymer B, it is contemplated that Polymer B can be any type of polycarbonate. For any of the ranges noted for Polymer A and Polymer B, it is contemplated that Polymer B can be bisphenol A polycarbonate or copolyestercarbonates or the polycarbonates as described in U.S. Pat. No. 6,043,322, incorporated herein by reference in its entirety.

Suitable examples of the polymeric components for Polymer B include, but are not limited to, nylon; polyesters different than those described herein; polyamides such as ZYTEL® from DuPont; polystyrene; polystyrene copolymers; styrene acrylonitrile copolymers; acrylonitrile butadiene styrene copolymers; poly(methylmethacrylate); acrylic copolymers; poly(ether-imides) such as ULTEM® (a poly(ether-imide) from General Electric); polyphenylene oxides such as poly(2,6-dimethylphenylene oxide) or poly(phenylene oxide)/polystyrene blends such as NORYL 1000® (a blend of poly(2,6-dimethylphenylene oxide) and polystyrene resins from General Electric); polyphenylene sulfides; polyphenylene sulfide/sulfones; poly(ester-carbonates); polycarbonates such as LEXAN® (a polycarbonate from General Electric); bisphenol polycarbonate; polysulfones; polysulfone ethers; and poly(ether-ketones) of aromatic dihydroxy compounds; or mixtures of any of the foregoing polymers.

The blends of the invention can be prepared by conventional processing techniques known in the art, such as melt blending or solution blending. In one embodiment, polycarbonate is not present in the polyester composition. If polycarbonate is used in a blend in the polyester compositions of the invention, the blends can be visually clear. However, polyester compositions useful in the invention also contemplate the exclusion of polycarbonate as well as the inclusion of polycarbonate.

Polycarbonates useful in the invention may be prepared according to known procedures, for example, by reacting the dihydroxyaromatic compound with a carbonate precursor such as phosgene, a haloformate or a carbonate ester, a molecular weight regulator, an acid acceptor and a catalyst.

Polycarbonates useful in the invention may be any polycarbonate known in the art including but not limited to bisphenol A polycarbonates. Other useful polycarbonates can be used such as those described in U.S. Pat. No. 6,043,322. Methods for preparing polycarbonates are known in the art and are described, for example, in U.S. Pat. No. 4,452,933, where the disclosure regarding the preparation of polycarbonates is hereby incorporated by reference herein.

The polycarbonates useful in the polyester compositions of the invention also may be copolyestercarbonates such as those described in U.S. Pat. Nos. 3,169,121; 3,207,814; 4,194,038; 4,156,069; 4,430,484, 4,465,820, and 4,981,898, where the disclosure regarding copolyestercarbonates from each of the U.S. patents is incorporated by reference herein.

Copolyestercarbonates useful in this invention can be available commercially and/or may be prepared by known methods in the art. For example, they can be typically obtained by the reaction of at least one dihydroxyaromatic compound with a mixture of phosgene and at least one dicarboxylic acid chloride, especially isophthaloyl chloride, terephthaloyl chloride, or both.

The polycarbonates comprising component (A) of the above-described embodiment of the present invention may be prepared according to known procedures by reacting the dihydroxyaromatic compound with a carbonate precursor such as phosgene, a haloformate or a carbonate ester, a molecular weight regulator, an acid acceptor and a catalyst. Methods for preparing polycarbonates are known in the art and are described, for example, in U.S. Pat. No. 4,452,933, which is hereby incorporated by reference herein.

Examples of suitable carbonate precursors include carbonyl bromide, carbonyl chloride, and mixtures thereof; diphenyl carbonate; a di(halophenyl)-carbonate, e.g., di(trichlorophenyl)carbonate, di(tribromophenyl)carbonate, and the like; di(alkylphenyl)carbonate, e.g., di(tolyl)carbonate; di(naphthyl)carbonate; di(chloronaphthyl)carbonate, or mixtures thereof; and bis-haloformates of dihydric phenols.

Examples of suitable molecular weight regulators include phenol, cyclohexanol, methanol, alkylated phenols, such as octylphenol, para-tertiary-butyl-phenol, and the like. The preferred molecular weight regulator is phenol or an alkylated phenol.

The acid acceptor may be either an organic or an inorganic acid acceptor. A suitable organic acid acceptor is a tertiary amine and includes such materials as pyridine, triethylamine, dimethylaniline, tributylamine, and the like. The inorganic acid acceptor can be either a hydroxide, a carbonate, a bicarbonate, or a phosphate of an alkali or alkaline earth metal.

The catalysts that can be used are those that typically aid the polymerization of the monomer with phosgene. Suitable catalysts include tertiary amines such as triethylamine, tripropylamine, N,N-dimethylaniline, quanternary ammonium compounds such as, for example, tetraethylammonium bromide, cetyl triethyl ammonium bromide, tetra-n-heptylammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The polycarbonate of component (A) also may be a copolyestercarbonate such as those described in U.S. Pat. Nos. 3,169,121; 3,207,814; 4,194,038; 4,156,069; 4,430,484, 4,465,820, and 4,981,898, all of which are incorporated by reference herein.

Copolyestercarbonates useful in this invention are available commercially. They are typically obtained by the reaction of at least one dihydroxyaromatic compound with a mixture of phosgene and at least one dicarboxylic acid chloride, especially isophthaloyl chloride, terephthaloyl chloride, or both.

Other polycarbonates useful in the invention are described in U.S. Pat. No. 6,043,322, incorporated herein by reference.

The ratio of polyester of the invention to polycarbonate may be determined by the individual practitioner of this invention. Typically, the weight ratio of polyester of the invention to polycarbonate will range from about 99:1 to about 1:99, preferably from about 75:25 to about 25:75, and most preferably is about 75:25 to about 50:50.

In addition, the polyester compositions and the polymer blend compositions useful in the invention may also contain additives in any amount such as from 0.01 to 25% by weight based on the total weight of the overall composition. Common additives can be colorants, dyes, mold release agents, flame retardants, plasticizers, nucleating agents, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition Reinforcing materials may be useful in the compositions of this invention. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

Suitable catalysts for use in the processes of the invention to make the polyesters useful in the invention include at least one titanium compound. The polyester compositions of the invention may also comprise at least one of the titanium compounds useful in the processes of the invention. Other catalysts could possibly be used in the invention in combination with at least one titanium compound Other catalysts may include, but are not limited to, those based on tin, gallium, zinc, antimony, cobalt, manganese, magnesium, germanium, lithium, aluminum compounds, and an aluminum compound with lithium hydroxide or sodium hydroxide. In one embodiment, the catalyst can be a combination of at least one tin compound and at least one titanium compound.

Catalyst amounts can range from 10 ppm to 20,000 ppm or 10 to 10,000 ppm, or 10 to 5000 ppm or 10 to 1000 ppm or 10 to 500 ppm, or 10 to 300 ppm or 10 to 250 ppm based on the catalyst metal and based on the weight of the final polymer. The process can be carried out in either a batch or continuous process. In one embodiment, the catalyst is a titanium compound. In one embodiment, the catalyst is solely a titanium compound. In one embodiment, the titanium compound can be used in either the esterification reaction or the polycondensation reaction or both reactions. In another embodiment, the catalyst is solely a titanium compound useful in the polyesters useful in the esterification reaction.

When titanium is added to the polyesters and/or polyester compositions and/or process of making the polyesters of the invention, it is added to the process of making the polyester in the form of a titanium compound. The amount of the titanium compound added to the polyesters of the invention and/or polyester compositions of the invention and/or processes of the invention can be measured in the form of titanium atoms present in the final polyester, for example, by weight measured in ppm.

The polyesters in general may be prepared by condensing the dicarboxylic acid or dicarboxylic acid ester with the glycol in the presence of the titanium catalyst described herein at elevated temperatures increased gradually during the course of the condensation up to a temperature of about 225°-310° C., in an inert atmosphere, and conducting the condensation at low pressure during the latter part of the condensation.

The invention further relates to the film(s) and/or sheet(s) comprising the polyester compositions of the invention. The methods of forming the polyesters into film(s) and/or sheet(s) are well known in the art. Examples of film(s) and/or sheet(s) of the invention including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting.

The invention further relates to bottles described herein. These bottles include, but are not limited to, injection blow molded bottles, injection stretch blow molded bottles, extrusion blow molded bottles, and extrusion stretch blow molded bottles. Methods of making bottles include but are not limited to extrusion blow molding, extrusion stretch blow molding, thermoforming, injection blow molding, and injection stretch blow molding. In each case, the invention further relates to the preforms (or parisons) used to make each of said bottles.

For the purposes of this invention, the term "wt" means "weight".

The following examples further illustrate how the polyesters of the invention can be made and evaluated, and are intended to be purely exemplary of the invention and are not intended to limit the scope thereof. Unless indicated otherwise, parts are parts by weight, temperature is in degrees C. or is at room temperature, and pressure is at or near atmospheric.

Examples

The following examples illustrate in general how a polyester is prepared and the effect of using 2,2,4,4-tetramethyl-1,3-cyclobutanediol (and various cis/trans mixtures) on various polyester properties such as toughness, glass transition temperature, inherent viscosity, etc., compared to polyesters comprising 1,4-cyclohexanedimethanol and/or ethylene glycol residues, but lacking 2,2,4,4-tetramethyl-1,3-cyclobutanediol. Additionally, based on the following examples, the skilled artisan will understand how the phosphorus species useful in the invention can be used in the preparation of polyesters containing them.

Measurement Methods

The inherent viscosity of the polyesters was determined in 60/40 (wt/wt) phenol/tetrachloroethane at a concentration of 0.25 g/50 ml at 25° C., and is reported in dL/g.

Color values reported herein are CIELAB L*, a*, and b* values measured following ASTM D 6290-98 and ASTM E308-99, using measurements from a Hunter Lab Ultrascan XE Spectrophotometer (Hunter Associates Laboratory Inc., Reston, Va.) with the following parameters: (1) D65 illuminant, (2) 10 degree observer, (3) reflectance mode with specular angle included, (4) large area view, (5) 1" port size. The measurements were performed on polymer granules ground to pass a 6 mm sieve according to the L*, a* and b* color system of the CIE (International Commission on Illumination).

The following abbreviations apply throughout the working examples and figures:

| | |
|---|---|
| TPA | Terephthalic acid |
| DMT | Dimethyl terephthalate |
| EG | Ethylene Glycol |
| CHDM | 1,4-cyclohexanedimethanol |
| IV | Inherent viscosity - dL/g |
| XRF | X-ray fluorescence |
| ICP | Inductively coupled plasma |
| SCFH | Standard cubit feet per hour |
| P | Phosphorus |
| Ti | Titanium |
| PETG | Glycol modified PET prepared according to the applicable example |
| RPM | Rounds per minute |
| Titanium | Titanium Isopropoxide, unless otherwise stated |
| Wt | Weight |
| g | gram |
| ppm | parts per million |

The invention has been described in detail with reference to the embodiments disclosed herein, but it will be understood that variations and modifications can be effected within the spirit and scope of the invention.

EXAMPLES

Examples Based on Terephthalic Acid as a Starting Material

Example 1

Oligomer Preparation—Pilot Plant Scale

An oligomeric material was prepared from terephthalic acid (TPA), ethylene glycol (EG), and 1,4-cyclohexanedimethanol (CHDM). Synthesis was carried out in a 120-gallon HASLELLOY reactor which is fitted with three sets of turbine agitators and a heated reflux column. To the 120-gallon reactor under a 20 SCFH nitrogen purge and with the heated reflux column at 190° C., 702.24 gram-moles of EG and 148.68 gram-moles of CHDM were charged. The agitator was started and the TPA was slowly added. The reactor was then pressurized to 45 psig using nitrogen gas and maintained at 45 psig throughout the esterification stage. Over a period of 14 hours and 10 minutes the temperature of the reaction mixture was ramped to 230° C. When the reaction mixture was 230° C. at 45 psig pressure, it was held for 80 minutes. Immediately after the 80 minute hold period, the temperature of the reaction mixture was increased to 250° C. When the reaction mixture was 250° C. at 45 psig, it was held for 70 minutes. After the 70 minute hold at 250° C. and 45 psig, the pressure was decreased to 10 psig. When the pressure was 10 psig, the reaction mixture was held at 250° C. and 10 psig for 20 minutes. After the 10 minute hold at 250° C. and 10 psig, the reactor pressure was reduced to 0 psig and the reactor was purged with 20 SCFH nitrogen. The molten reaction mixture was drained into 5-gallon open-head metal buckets. The reaction mixture was allowed to cool to 23° C. The cooled reaction mixture was broken up and then ground in a grinder to <8-mm size.

By GC analysis the resulting oligomer material contained 68.72 mol % EG moiety, 27.37 mol % CHDM moiety, and 3.55 mol % diethylene glycol moiety.

113 grams of oligomer were used for each experiment.

Example 2

Catalyst Solution Preparation

Catalyst Solution: The catalyst used was titanium(IV) isopropoxide in ethylene glycol solution. The catalyst solution was analyzed to be 0.33 wt % in titanium.

Preparation of Merpol®A/Ethylene Glycol Solution: Merpol®A and ethylene glycol were combined in a clear 8 oz narrow-mouthed jar and magnetically stirred at 225° C. for one hour to achieve a clear and colorless solution. (See Table #1)

TABLE 1

|  | Merpol ® A (g) | Ethylene Glycol (g) | XRF (wt % P) |
|---|---|---|---|
| Example 2 | 11.36 | 88.64 | 1.09 |

Example 3

Preparation of 1,2-Ethylenediphosphonic Acid/Ethylene Glycol Solution 1,2-ethylenediphosphonic acid and ethylene glycol were combined in a in clear 8 oz narrow-mouthed jar and magnetically stirred at room temperature for one hour to achieve a slightly cloudy and colorless solution. The solution was then heated to 60° C. for 15 minutes to achieve a clear and colorless solution. (See Table #2)

TABLE 2

|  | 1,2-Ethylenediphosphonic Acid (g) | Ethylene Glycol (g) | XRF (wt % P) |
|---|---|---|---|
| Example 3 | 3.37 | 96.63 | 1.06 |

Example 4

Preparation of Etidronic Acid/Ethylene Glycol Solution

Etidronic acid (60 weight percent in water) and ethylene glycol were combined in a in clear 8 oz narrow-mouthed jar and magnetically stirred at room temperature for one hour to achieve a colorless solution. (See Table #3)

TABLE 3

|  | Etidronic acid (g) | Ethylene Glycol (g) | ICP (wt % P) |
|---|---|---|---|
| Example 4 | 6.10 | 93.90 | 1.04 |

Example 5

Polymer Synthesis

PETG Catalyst Deactivation and Color Inhibition: Titanium catalyzed PETG polymers incorporating phosphorus-based compounds were prepared in a laboratory process incorporating typical polymer rigs and associated hardware. PETG oligomer and target quantities of titanium tetraisopropoxide/butanol, and phosphorus/ethylene glycol solutions were charged up front to a 500 mL round-bottom flask (See Table #4 and Table #5). Heating was accomplished using a Belmont metal bath in contact with a heating mantle. Agitation was provided by a motorized stirring system and a stainless steel one quarter inch diameter rod with an anchor shaped agitation head which was placed in a 500 ml round-bottom flask containing raw materials. The agitator was held in place by a septa equipped polymer head. Connected to the polymer head was a glass side arm through which liquids were removed during the polymerization. Liquid by-products were trapped using a 500 mL vacuum flask (condensate receiver) which was placed in a stainless steel bucket filled with dry ice. The condensate flask was connected through vacuum tubing to a dry ice/IpOH trap, which was connected by vacuum tubing to a standard lab vacuum pump. Prior to use, glassware was cleaned in a potassium hydroxide/isopropyl alcohol bath followed by an Alconox/water wash, water rinse, and drying.

TABLE 4

Catalyst solution charges

| Example Number | Titanium Isopropoxide/ EG Charge (g) | Merpol ® A/ EG Charge (g) | 1,2-ethylenediphosphonic Acid/EG Charge (g) | Etidronic acid/EG charge (g) | EG Charge (g) |
|---|---|---|---|---|---|
| Example 5A | 0.5454 | 0.5047 |  |  |  |
| Example 5B | 0.5454 | 0.5051 |  |  |  |
| Example 5C | 0.5458 | 0.5042 |  |  |  |
| Example 5D | 0.5450 | 0.5042 |  |  |  |
| Example 5E | 0.5455 |  | 0.2165 |  | 0.3013 |
| Example 5F | 0.5450 |  | 0.2163 |  | 0.3013 |
| Example 5G | 0.5456 |  | 0.2166 |  | 0.3011 |
| Example 5H | 0.5454 |  | 0.2172 |  | 0.3015 |
| Example 5I | 0.5454 |  |  | 0.5140 |  |
| Example 5J | 0.5454 |  |  | 0.5140 |  |
| Example 5K | 0.5454 |  |  | 0.5140 |  |
| Example 5L | 0.5454 |  |  | 0.5140 |  |
| Example 5M | 0.5454 |  |  | 0.2150 |  |
| Example 5N | 0.5454 |  |  | 0.2150 |  |

The Camile monitoring and process control system provided automated control of temperature, vacuum, and agitation during the polymerization.

The following Camile sequence was executed:

TABLE 5

PTA Camile sequence

| Stage Number | Time (min) | Temp (° C.) | Vacuum (torr) | Stir (RPM) |
|---|---|---|---|---|
| 1 | 0.1 | 265 | 760 | 0 |
| 2 | 5 | 265 | 760 | 30 |
| 3 | 5 | 265 | 130 | 100 |
| 4 | 73 | 265 | 130 | 100 |
| 5 | 10 | 265 | 3 | 100 |
| 6 | 70 | 270 | 3 | 100 |
| 7 | 10 | 278 | 0.3 | 50 |
| 8 | 60 | 278 | 0.3 | 50 |
| 9 | 2 | 278 | 650 | 50 |
| 10 | 1 | 278 | 650 | 50 |
| 11 | 1 | 278 | 140 | 50 |
| 12 | 5 | 278 | 140 | 50 |
| 13 | 2 | 300 | 400 | 0 |
| 14 | 2 | 300 | 760 | 0 |

The resulting PETG polymer was removed from the stir rod, chilled in liquid nitrogen, and ground to 3 mm particles in a Wiley Mill. PETG grinds were submitted for X-ray fluorescence, IV, and Appearance analysis.

TPA Based Data:

The data in the following table show that 1,2-ethylene diphosphonic acid and etridronic acid, when added at levels that lead to a similar activity of merpol A, improve polymer b* by 30-50%.

TABLE 6

| Example# | Ti (ppm) | P (ppm) | IV | L* | a* | b* |
|---|---|---|---|---|---|---|
| Titanium + Merpol A | | | | | | |
| Example 5A | 18.3 | 43.4 | 0.755 | 59.46 | 0.41 | 24.60 |
| Example 5B | 18.3 | 41.6 | 0.743 | 74.14 | −1.19 | 20.48 |
| Example 5C | 18.3 | 52.8 | 0.770 | 59.93 | −0.23 | 24.89 |
| Example 5D | 18.5 | 45.0 | 0.766 | 59.06 | 0.37 | 24.83 |
| Titanium + 1,2-ethylene diphosphonic acid | | | | | | |
| Example 5E | 18.370 | 24.0 | 0.709 | 81.28 | −2.05 | 14.34 |
| Example 5F | 18.358 | 25.0 | 0.702 | 81.83 | −1.51 | 14.91 |
| Example 5G | 19.520 | 24.0 | 0.645 | 73.57 | −0.97 | 18.60 |
| Example 5H | 18.639 | 23.0 | 0.647 | 71.01 | −0.15 | 18.25 |
| Titanium + etidronic acid | | | | | | |
| Example 5I | 19.5 | 38.6 | 0.741 | 76.36 | −1.13 | 9.79 |
| Example 5J | 19.3 | 39.7 | 0.736 | 77.99 | −1.08 | 10.37 |
| Example 5K | 21.5 | 40.9 | 0.748 | 76.43 | −1.22 | 10.11 |
| Example 5L | 19.2 | 40.7 | 0.739 | 78.30 | −1.03 | 10.40 |
| Example 5M | 19.2 | 21.6 | 0.844 | 75.44 | −2.24 | 15.09 |
| Example 5N | 19.0 | 20.7 | 0.811 | 76.51 | −2.23 | 14.41 |

Example 6

DMT-Based Samples

The same catalyst and deactivator solutions were used for the DMT and TPA based experiments. Titanium catalyzed PETG polymers prepared from DMT and incorporating phosphorus-based catalyst deactivation/color inhibition were prepared in a laboratory process incorporating typical polymer rigs and associated hardware. Target quantities of DMT, ethylene glycol, CHDM, and titanium tetraisopropoxide/butanol were charged up front to a 500 mL round bottom flask (See Table #6 and Table #7). Heating was accomplished using a Belmont metal bath in contact with a heating mantle. Agitation was provided by a motorized stirring system and a stainless steel one quarter inch diameter rod with an anchor shaped agitation head which was placed in a 500 ml round-bottom flask containing raw materials. The agitator was held in place by a septa equipped polymer head. Connected to the polymer head was a glass side arm through which liquids were removed during ester exchange and polymerization. Liquid by-products were trapped using a 500 mL vacuum flask (condensate receiver) which was placed in a stainless steel bucket filled with dry ice. The condensate flask was connected through vacuum tubing to a dry ice/IpOH trap, which was connected by vacuum tubing to a standard lab vacuum pump. Prior to use, glassware was cleaned in a potassium hydroxide/isopropyl alcohol bath followed by an Alconox/water wash, water rinse, and drying. The reaction flask was 50% submerged initially. Phosphorus/ethylene glycol solutions were added to the reaction flask at stage 6 of the Camile recipe, and the flask was fully submerged at stage 7 (See Camile recipe and Table #7 below).

The Camile monitoring and process control system provided automated control of temperature, vacuum, and agitation during the polymerization.

The following Camile sequence was executed:

TABLE 7

DMT Camile sequence

| Stage Number | Time (min) | Temp (° C.) | Vacuum (torr) | Stir (RPM) |
|---|---|---|---|---|
| 1 | 0.1 | 200 | 760 | 0 |
| 2 | 10 | 200 | 760 | 200 |
| 3 | 60 | 200 | 760 | 200 |
| 4 | .1 | 215 | 760 | 200 |
| 5 | 60 | 215 | 760 | 200 |
| 6 | 1 | 270 | 760 | 200 |
| 7 | 20 | 270 | 760 | 50 |
| 8 | 3 | 270 | 0.7 | 50 |
| 9 | 30 | 275 | 0.7 | 50 |
| 10 | .1 | 275 | 0.5 | 50 |
| 11 | 60 | 275 | 0.5 | 50 |
| 12 | 2 | 285 | 400 | 0 |
| 13 | 1 | 285 | 760 | 0 |

The resulting PETG polymer was removed from the stir rod, chilled in liquid nitrogen, and ground to 3 mm particles in a Wiley Mill. The polymer particles were submitted for X-ray fluorescence, IV, and appearance analysis.

TABLE 8

| Example Number | DMT Charge (g) | CHDM Charge (g) | EG Charge (g) | Target Titanium (ppm) | Target Phosphorus (ppm) |
|---|---|---|---|---|---|
| Raw material charges | | | | | |
| Titanium only | | | | | |
| Example 6A | 89.25 | 20.74 | 48.12 | 18 | 0 |
| Example 6B | 89.22 | 20.77 | 48.11 | 18 | 0 |
| Example 6C | 89.23 | 20.73 | 48.11 | 18 | 0 |
| Titanium + 1,2-ethylene diphosphonic acid | | | | | |
| Example 6D | 89.27 | 20.76 | 48.10 | 18 | 23 |
| Example 6E | 89.24 | 20.77 | 48.12 | 18 | 23 |
| Titanium + Merpol A | | | | | |
| Example 6F | 89.21 | 20.72 | 48.11 | 18 | 55 |
| Example 6G | 89.22 | 20.74 | 48.13 | 18 | 55 |

TABLE 9

| Example Number | Titanium Isopropoxide/ EG Charge (g) | Merpol ® A/ EG Charge (g) | 1,2-ethylenediphos- phonic Acid/EG Charge (g) | Compensation EG Charge (g) |
|---|---|---|---|---|
| Titanium only | | | | |
| Example 6A | 0.7277 | | | |
| Example 6B | 0.7278 | | | |
| Example 6C | 0.7274 | | | |
| Titanium + 1,2-ethylene diphosphonic acid | | | | |
| Example 6D | 0.7275 | | 0.2169 | 0.3020 |
| Example 6E | 0.7275 | | 0.2172 | 0.3019 |
| Titanium + Merpol A | | | | |
| Example 6F | 0.7271 | 0.5045 | | |
| Example 6G | 0.7273 | 0.5047 | | |

DMT Based Data:

TABLE 10

| Example# | Ti (ppm) | P (ppm) | IV (PM95) | L* | a* | b* |
|---|---|---|---|---|---|---|
| Titanium only | | | | | | |
| Example 6A | 26.1 | 1.0 | 0.862 | 79.25 | −2.61 | 13.21 |
| Example 6B | 26.6 | 0.5 | 0.853 | 80.37 | −2.07 | 11.86 |
| Example 6C | 26.1 | 0 | 0.950 | 83.53 | −2.22 | 15.60 |
| Titanium + 1,2-ethylene diphosphonic acid | | | | | | |
| Example 6D | 26.1 | 23.8 | 0.788 | 78.11 | −0.32 | 6.85 |
| Example 6E | 27.2 | 24.8 | 0.782 | 76.54 | −0.66 | 7.06 |
| Titanium + Merpol A | | | | | | |
| Example 6F | 26.3 | 36.7 | 0.782 | 75.54 | −1.49 | 10.25 |
| Example 6G | 26.6 | 37.7 | 0.787 | 76.79 | −1.45 | 9.18 |

Blending Experiments (Extruder Scale)

All polyester-polycarbonate compositions were made by extruding using either 70/30 weight blend or a 50/50 by weight blend of (1) a polyester comprised of 100 mole percent terephthalic acid residues, 38 mole percent ethylene glycol residues and 62 mole percent 1,4-cyclohexanedimethanol residues having an inherent viscosity of about 0.73 (2) a bisphenol A polycarbonate supplied by Bayer as Makrolon 2608 polycarbonate and (3) the additive concentrate noted as either Additive A, Additive B, or Additive C. All additive concentrates are based on a polyester comprised of 100 mole percent terephthalic acid residues, 38 mole percent ethylene glycol residues and 62 mole percent 1,4-cyclohex-anedimethanol residue. Additive A is 5 weight percent % Weston 619 added to the polyester to make a concentrate. Additive B is 4 weight percent phosphorous acid salt added to the polyester to make a concentrate. Additive C is 2 weight percent of 1,2 ethanebisphosphonic acid added to the polyester to make a concentrate. The additives are then blended with the polyester/polycarbonate blends at various ratios to be described.

The blends were made on a 1.5" 30:1 L/D Sterling single screw compounding extruder having a medium shear screw design. All zone temperatures and adapters were set to 260 degree. C. except for Zone 1 that was set at 240.degree. C and the strand die that was set at 250° C. The feed zone was cooled by circulating water and the screw speed was set to 80 revolution per minute (rpm). The material was dried separately with the polyester being dried at 65 degree C. for 8 hours and the polycarbonate being dried at 120 degree C. for 8 hrs. The additive concentrates were dried at 65 degree C. for 8 hours. The polycarbonate sample was cooled to 65 degree C. prior to blending with the polyesters and the additive concentrates.

The first 5 minutes of extrudate was not collected in order to ensure the extruder had been adequately purged. When multiple concentrations of the same mixture of additives were extruded, the lower concentrations of additives always were extruded first. Samples were collected after the strands were quenched in a water bath prior to being chopped into pellets using a Conair pelletizing cutter.

The color of the polymer pellets is determined in a conventional manner using a HunterLab UltraScan Colorimeter manufactured by Hunter Associates Laboratory, Inc., Reston, Va. The instrument is operated using HunterLab Universal Software (version 3.8). Calibration and operation of the instrument is according to the HunterLab User Manual and is largely directed by the Universal Software. To reproduce the results on any colorimeter, run the instrument according to its instructions and use the following testing parameters: D65 Light Source (daylight, 6500.degree. K color temperature), Reflectance Mode, Large Area View, Specular Included, CIE 10.degree. Observer, Outputs are CIE L*, a*, b*. The pellets are placed in a holder that is 25 mm deep by 55 mm wide and high. The holder is black with a window on one side. During testing, the clear side of the holder is held at the reflectance port of the calorimeter as is normally done when testing in reflectance mode. An increase in the positive b* value indicates yellowness, while a decrease in the numerical value of b* indicates a reduction in yellowness. Color measurement and practice are discussed in greater detail in Anni Berger-Schunn in Practical Color Measurement, Wiley, NY pages 39-56 and 91-98 (1994). Preferably, the b* value is less than +4, more preferably from about +1 to about +2.

Examples 7-12 and Comparative Examples 1-10

Comparative Example 1

70 weight percent of polyester was blended with 30 weight percent polycarbonate and extruded into pellets on a Sterling extruder. The pellets were captured and color was measured on the pellets. The data can be observed in Table 1.

Comparative Example 2

70 weight percent of polyester was blended with 30 weight percent polycarbonate and 750 ppm active KA201 stabilizer.

The blend was then extruded into pellets on a Sterling extruder. The pellets were captured and color was measured on the pellets. The data can be observed in Table 1.

Comparative Example 3

70 weight percent of polyester was blended with 30 weight percent polycarbonate and 500 ppm active KA201 stabilizer. The blend was then extruded into pellets on a Sterling extruder. The pellets were captured and color was measured on the pellets. The data can be observed in Table 1.

Comparative Example 4

70 weight percent of polyester was blended with 30 weight percent polycarbonate and 500 ppm active KA202 stabilizer. The blend was then extruded into pellets on a Sterling extruder. The pellets were captured and color was measured on the pellets. The data can be observed in Table 1.

Comparative Example 5

70 weight percent of polyester was blended with 30 weight percent polycarbonate and 1000 ppm active KA202 stabilizer. The blend was then extruded into pellets on a Sterling extruder. The pellets were captured and color was measured on the pellets. The data can be observed in Table 1.

Example 7

70 weight percent of polyester was blended with 30 weight percent polycarbonate and 250 ppm active EX640-20A stabilizer. The blend was then extruded into pellets on a Sterling extruder. The pellets were captured and color was measured on the pellets. The data can be observed in Table 1 and shows improved b* reduction relative to comparative example 1 and similar b* reduction to the other stabilization systems even at reduced loadings.

Example 8

70 weight percent of polyester was blended with 30 weight percent polycarbonate and 500 ppm active EX640-20A stabilizer. The blend was then extruded into pellets on a Sterling extruder. The pellets were captured and color was measured on the pellets. The data can be observed in Table 1 and shows improved b* reduction relative to comparative example 1 and similar b* reduction to the other stabilization systems even at reduced loadings.

Example 9

70 weight percent of polyester was blended with 30 weight percent polycarbonate and 1000 ppm active EX640-20A stabilizer. The blend was then extruded into pellets on a Sterling extruder. The pellets were captured and color was measured on the pellets. The data can be observed in Table 1 and shows improved b* reduction relative to comparative example 1 and similar b* reduction to the other stabilization systems.

Comparative Example 6

50 weight percent of polyester was blended with 50 weight percent polycarbonate and extruded into pellets on a Sterling extruder. The pellets were captured and color was measured on the pellets. The data can be observed in Table 1.

Comparative Example 7

50 weight percent of polyester was blended with 50 weight percent polycarbonate and 750 ppm active KA201 stabilizer. The blend was then extruded into pellets on a Sterling extruder. The pellets were captured and color was measured on the pellets. The data can be observed in Table 1.

Comparative Example 8

50 weight percent of polyester was blended with 50 weight percent polycarbonate and 500 ppm active KA201 stabilizer. The blend was then extruded into pellets on a Sterling extruder. The pellets were captured and color was measured on the pellets. The data can be observed in Table 1.

Comparative Example 9

50 weight percent of polyester was blended with 50 weight percent polycarbonate and 500 ppm active KA202 stabilizer. The blend was then extruded into pellets on a Sterling extruder. The pellets were captured and color was measured on the pellets. The data can be observed in Table 1.

Comparative Example 10

50 weight percent of polyester was blended with 50 weight percent polycarbonate and 1000 ppm active KA202 stabilizer. The blend was then extruded into pellets on a Sterling extruder. The pellets were captured and color was measured on the pellets. The data can be observed in Table 1.

Example 10

50 weight percent of polyester was blended with 50 weight percent polycarbonate and 250 ppm active EX640-20A stabilizer. The blend was then extruded into pellets on a Sterling extruder. The pellets were captured and color was measured on the pellets. The data can be observed in Table 1 and shows improved b* reduction relative to comparative example 1 and similar b* reduction to the other stabilization systems even at reduced loadings.

Example 11

50 weight percent of polyester was blended with 50 weight percent polycarbonate and 500 ppm active EX640-20A stabilizer. The blend was then extruded into pellets on a Sterling extruder. The pellets were captured and color was measured on the pellets. The data can be observed in Table 1 and shows improved b* reduction relative to comparative example 1 and similar b* reduction to the other stabilization systems even at reduced loadings.

Example 12

50 weight percent of polyester was blended with 50 weight percent polycarbonate and 1000 ppm active EX640-20A stabilizer. The blend was then extruded into pellets on a Sterling extruder. The pellets were captured and color was measured on the pellets. The data can be observed in Table 1 and shows improved b* reduction relative to comparative example 1 and similar b* reduction to the other stabilization systems.

TABLE 11

| Example | Stabilizer Concentrate Type | Stabilizer Concentrate % | Active (ppm) | Pellet Color L* | Pellet Color a* | Pellet Color b* |
|---|---|---|---|---|---|---|
| 70% Polyester (1)/30% Polycarbonate (2) | | | | | | |
| CE #1 | None | 0% | 0 | 61.29 | −0.89 | 2.46 |
| CE #2 | Additive A | 1.5% | 750 | 62.24 | −0.93 | 0.57 |
| CE #3 | Additive A | 3% | 1500 | 62.11 | −0.92 | −0.12 |
| CE #4 | Additive B | 1% | 500 | 63.28 | −0.97 | 0.71 |
| CE #5 | Additive B | 2% | 1000 | 63.41 | −0.99 | 0.76 |
| Example #7 | Additive C | 1.25% | 250 | 62.71 | −0.75 | 0.74 |
| Example #8 | Additive C | 2.5% | 500 | 63.1 | −0.7 | 0.65 |
| Example #9 | Additive C | 5% | 1000 | 62.34 | −0.64 | 1.09 |
| 50% Polyester (1)/50% Polycarbonate (2) | | | | | | |
| CE #6 | None | 0% | 0 | 62.37 | −0.78 | 3.64 |
| CE #7 | Additive A | 1.5% | 750 | 64.02 | −0.87 | 1.05 |
| CE #8 | Additive A | 3% | 1500 | 63.65 | −0.83 | 0.28 |
| CE #9 | Additive B | 1% | 500 | 63.46 | −0.86 | 1.17 |
| CE #10 | Additive B | 2% | 1000 | 64.42 | −0.83 | 1.18 |
| Example #10 | Additive C | 1.25% | 250 | 63.68 | −0.67 | 1.07 |
| Example #11 | Additive C | 2.5% | 500 | 63.57 | −0.65 | 1.17 |
| Example #12 | Additive C | 5% | 1000 | 63.87 | −0.6 | 1.81 |

The invention has been described in detail with reference to the embodiments disclosed herein, but it will be understood that variations and modifications can be effected within the spirit and scope of the invention.

What is claimed is:

1. A polymer blend comprising
(A) a polyester composition comprising
   (I) at least one polyester (Polymer A) which comprises:
      (a) a dicarboxylic acid component comprising:
         (i) 70 to 100 mole % of terephthalic acid residues;
         (ii) 0 to 30 mole % of aromatic dicarboxylic acid residues having up to 20 carbon atoms; and
         (iii) 0 to 10 mole % of aliphatic dicarboxylic acid residues having up to 16 carbon atoms; and
      (b) a glycol component comprising:
         (i) about 10 to about 90 mole % of ethylene glycol residues; and
         (ii) about 90 to about 10 mole % of cyclohexanedimethanol residues;
   (II) residues of at least one titanium compound; and
   (III) at least one chelating phosphorus species, reaction products thereof, or mixtures thereof, represented by the structure:

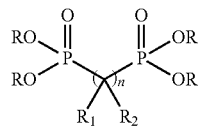

wherein:
n=an integer from 1 to 4;
R is hydrogen or $C_1$-$C_{22}$-alkyl; and
R1 and R2 are each hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.; and
(B) at least one polycarbonate (Polymer B),
wherein said polyester (Polymer A) has a phosphorus atom to titanium atom ratio in the final product of from 1:1 to 5:1.

2. The polyester blend of claim 1 wherein R is hydrogen.

3. A polymer blend comprising
(A) a polyester composition comprising
   (I) at least one polyester (Polymer A) which comprises:
      (a) a dicarboxylic acid component comprising:
         (i) 70 to 100 mole % of terephthalic acid residues;
         (ii) 0 to 30 mole % of aromatic dicarboxylic acid residues having up to 20 carbon atoms; and
         (iii) 0 to 10 mole % of aliphatic dicarboxylic acid residues having up to 16 carbon atoms; and
      (b) a glycol component comprising:
         (i) about 10 to about 90 mole % of ethylene glycol residues; and
         (ii) about 90 to about 10 mole % of cyclohexanedimethanol residues:
   (II) residues of at least one titanium compound; and
   (III) at least one chelating phosphorus species, reaction products thereof, or mixtures thereof, represented by the structure:

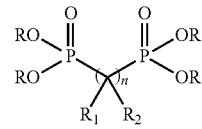

wherein:
n=an integer from 1 to 4;
R is $C_1$-$C_{22}$-alkyl; and
R1 and R2 are each hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.; and
(B) at least one polycarbonate (Polymer B).

4. The polyester blend of claim 1 wherein R1 is $C_1$-$C_{22}$-alkyl.

5. The polyester blend of claim 1 wherein R1 is hydroxyl.

6. The polyester blend of claim 1 wherein R2 is $C_1$-$C_{22}$-alkyl.

7. The polyester blend of claim 1 wherein R is hydrogen, R1 is hydroxyl and R2 is $C_1$-$C_{22}$-alkyl.

8. The polyester blend of claim 1 wherein R is hydrogen, R1 is hydroxyl, R2 is methyl and n is 1.

9. A polymer blend comprising
(A) a polyester composition comprising
   (I) at least one polyester (Polymer A) which comprises:
      (a) a dicarboxylic acid component comprising:
         (i) 70 to 100 mole % of terephthalic acid residues;

(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 10 to about 90 mole % of ethylene glycol residues; and
(ii) about 90 to about 10 mole % of cyclohexanedimethanol residues;
(II) residues of at least one titanium compound; and
(III) at least one chelating phosphorus species, reaction products thereof, or mixtures thereof, represented by the structure:

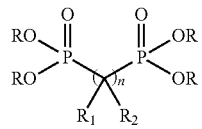

wherein:
n=a 2;
R is hydrogen; and
R1 and R2 are each hydrogen;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.; and
(B) at least one polycarbonate (Polymer B).

10. The polyester blend of claim 1 wherein the polyester (Polymer A) comprises 20 to 80 mole % of 1,4-cyclohexanedimethanol residues and 20 to 80 mole % of ethylene glycol residues.

11. The polyester blend of claim 1 wherein the polyester (Polymer A) comprises 20 to 60 mole % of 1,4-cyclohexanedimethanol residues and 40 to 80 mole % of ethylene glycol residues.

12. The polyester blend of claim 1 wherein the polyester (Polymer A) comprises 20 to 40 mole % of 1,4-cyclohexanedimethanol residues and 60 to 80 mole % of ethylene glycol residues.

13. The polyester blend of claim 1 wherein the polyester (Polymer A) comprises 25 to 40 mole % of 1,4-cyclohexanedimethanol residues and 60 to 75 mole % of ethylene glycol residues.

14. The polyester blend of claim 1, wherein said polyester (Polymer A) has a Tg of 70 to 140° C.

15. The polyester blend of claim 1, wherein said polyester (Polymer A) has a Tg of 80 to 120° C.

16. The polyester blend of claim 1, wherein the dicarboxylic acid component of the polyester (Polymer A) comprises 80 to 100 mole % of terephthalic acid residues.

17. The polyester blend of claim 1, wherein the dicarboxylic acid component of the polyester (Polymer A) comprises 90 to 100 mole % of terephthalic acid residues.

18. The polyester blend of claim 1, wherein said polyester comprises residues of modifying glycols.

19. The polyester blend of claim 1, wherein said polyester (Polymer A) comprises 2,2,4,4-tetramethyl-1,3-cyclobutanediol residues.

20. The polyester blend of claim 1, wherein said polycarbonate (Polymer B) is a bisphenol A polycarbonate.

21. The polyester blend of claim 1, wherein said polyester (Polymer A) comprises residues of at least one branching agent.

22. The polyester blend of claim 21, wherein said polyester (Polymer A) comprises residues of at least one branching agent an amount of 0.01 to 10 mole % based on the total mole percentage of the diacid or diol residues.

23. The polyester blend of claim 21, wherein said polyester (Polymer A) comprises residues of at least one branching agent an amount of 0.01 to 5 mole % based on the total mole percentage of the diacid or diol residues.

24. The polyester blend of claim 1, having a b* value of from −10 to less than 20 and the L* values can be from 50 to 90 according to the L*, a* and b* color system of the CIE (International Commission on Illumination).

25. A polymer blend comprising
(A) a polyester composition comprising
(I) at least one polyester (Polymer A) which comprises:
(a) a dicarboxylic acid component comprising:
(i) 70 to 100 mole % of terephthalic acid residues:
(ii) 0 to 30 mole % of aromatic dicarboxylic acid residues having up to 20 carbon atoms; and
(iii) 0 to 10 mole % of aliphatic dicarboxylic acid residues having up to 16 carbon atoms; and
(b) a glycol component comprising:
(i) about 10 to about 90 mole % of ethylene glycol residues; and
(ii) about 90 to about 10 mole % of cyclohexanedimethanol residues;
(II) residues of at least one titanium compound; and
(III) at least one chelating phosphorus species, reaction products thereof, or mixtures thereof, represented by the structure:

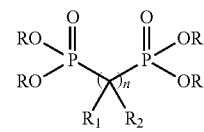

wherein:
n=an integer from 1 to 4;
R is hydrogen or $C_1$-$C_{22}$-alkyl; and
R1 and R2 are each hydrogen, $C_1$-$C_{22}$-alkyl, hydroxyl, or aryl;
wherein the total mole % of the dicarboxylic acid component is 100 mole %,
wherein the total mole % of the glycol component is 100 mole %; and
wherein the inherent viscosity of the polyester is from 0.35 to 1.2 dL/g as determined in 60/40 (wt/wt) phenol/tetrachloroethane at a concentration of 0.25 g/50 ml at 25° C.; and
(B) at least one polycarbonate (Polymer B),
wherein said polyester (Polymer A) has a phosphorus atom to titanium atom ratio in the final product of 2:1.

26. The polyester blend of claim 1, wherein said polyester blend comprises at least one additive selected from the group consisting of colorants, dyes, mold release agents, flame retardants, plasticizers, nucleating agents, UV stabilizers, glass fiber, carbon filaments, fillers, impact modifiers, or a mixture thereof.

27. The polymer blend of claim 1 comprising about 40 weight % to about 80 weight % of Polymer A and about 20 to about 60 weight % of Polymer B wherein the total weight percentages equal 100 weight % of the polymer blend.

28. The polymer blend of claim 1 comprising about 50 weight % to about 70 weight % of Polymer A and about 30 to about 50 weight % of Polymer B wherein the total weight percentages equal 100 weight % of the polymer blend.

29. A polymer blend comprising
(A) a polyester composition comprising:
 (I) at least one polyester (Polymer A) which comprises:
  (a) a dicarboxylic acid component comprising:
   (i) 70 to 100 mole % of terephthalic acid residues;
   (ii) 0 to 30 mole % of aromatic dicarboxylic acid residues having up to 20 carbon atoms; and
   (iii) 0 to 10 mole % of aliphatic dicarboxylic acid residues having up to 16 carbon atoms; and
  (b) a glycol component comprising:
   (i) about 10 to about 90 mole % of ethylene glycol residues; and
   (ii) about 90 to about 10 mole % of cyclohexanedimethanol residues;
 (II) residues of at least one titanium compound; and
 (III) at least one chelating phosphorus species, reaction products thereof, or mixtures thereof, represented by the structure:

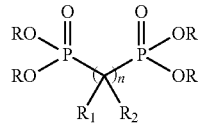

wherein:

n=an integer from 1 to 4;

R is hydrogen or $C_1$-$C_{22}$-alkyl; and

R1 and R2 are each hydrogen, $C_1$-$C_{22}$-alkyl, hydroxyl, or aryl;

wherein the total mole % of the dicarboxylic acid component is 100 mole %, wherein the total mole % of the glycol component is 100 mole %; and wherein the inherent viscosity of the polyester is from 0.35 to 1.2 dL/g as determined in 60/40 (wt/wt) phenol/tetrachloroethane at a concentration of 0.25 g/50 ml at 25° C.; and (B) at least one bisphenol A polycarbonate (Polymer B), wherein said polyester (Polymer A) has a phosphorus atom to titanium atom ratio in the final product of from 1:1 to 5:1.

30. The polymer blend of claim 29 comprising about 40 weight % to about 80 weight % of Polymer A and about 20 to about 60 weight % of Polymer B wherein the total weight percentages equal 100 weight % of the polymer blend.

31. The polymer blend of claim 29 comprising about 50 weight % to about 70 weight % of Polymer A and about 30 to about 50 weight % of Polymer B wherein the total weight percentages equal 100 weight % of the polymer blend.

* * * * *